(12) United States Patent
Horvitz

(10) Patent No.: US 7,512,940 B2
(45) Date of Patent: Mar. 31, 2009

(54) METHODS AND APPARATUS FOR DOWNLOADING AND/OR DISTRIBUTING INFORMATION AND/OR SOFTWARE RESOURCES BASED ON EXPECTED UTILITY

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 09/820,519

(22) Filed: Mar. 29, 2001

(65) Prior Publication Data
US 2003/0154282 A1  Aug. 14, 2003

(51) Int. Cl.
*G06F 9/44* (2006.01)

(52) U.S. Cl. .................................................... 717/173

(58) Field of Classification Search ......... 717/168–178; 709/219; 711/134
See application file for complete search history.

(56) References Cited

U.S. PATENT DOCUMENTS

| | | | |
|---|---|---|---|
| 5,155,847 A * | 10/1992 | Kirouac et al. | 717/170 |
| 5,276,860 A * | 1/1994 | Fortier et al. | 714/6 |
| 5,493,692 A | 2/1996 | Theimer et al. | |
| 5,544,321 A | 8/1996 | Theimer et al. | |
| 5,555,376 A | 9/1996 | Theimer et al. | |
| 5,559,984 A * | 9/1996 | Nakano et al. | 711/121 |
| 5,603,054 A | 2/1997 | Theimer et al. | |
| 5,611,050 A | 3/1997 | Theimer et al. | |
| 5,704,017 A * | 12/1997 | Heckerman et al. | 706/12 |
| 5,745,879 A * | 4/1998 | Wyman | 705/1 |
| 5,812,865 A | 9/1998 | Theimer et al. | |
| 5,813,017 A * | 9/1998 | Morris | 707/204 |
| 5,884,282 A * | 3/1999 | Robinson | 705/27 |
| 5,918,014 A * | 6/1999 | Robinson | 709/219 |
| 5,925,100 A * | 7/1999 | Drewry et al. | 709/219 |
| 5,960,204 A * | 9/1999 | Yinger et al. | 717/176 |
| 6,049,549 A * | 4/2000 | Ganz et al. | 370/449 |

(Continued)

FOREIGN PATENT DOCUMENTS

WO  9800787  1/1998

OTHER PUBLICATIONS

Cao et al.; "Cost-Aware WWW Proxy Caching Algorithms"; Proceedings of the USENIX Symposiumn on Internet Technologies and Systems; Dec. 1997; pp. 1-14.*

(Continued)

*Primary Examiner*—Tuan Anh Vu
(74) *Attorney, Agent, or Firm*—Amin, Turocy & Calvin, LLP

(57) ABSTRACT

A resource download process is provided which includes accepting and/or determining evidence about user based factors, accepting and/or determining resource based factors, and maximizing the expected value of downloading resources. A resource distribution process is provided which includes accepting and/or determining user based factors, accepting and/or determining resource based factors, accepting and/or determining intermediate storage facility based factors, and minimizing the total expected latencies between requesting and receiving resources. A process for distributing resources is provided which includes determining a change in value and a change in cost of storing resources on a first storage facility versus storing resources on a second storage facility, determining a value density based on the change in value and the change in cost, and maximizing a total value density given a total size of resources being less than the finite available capacity of the first storage facility.

42 Claims, 22 Drawing Sheets

U.S. PATENT DOCUMENTS

| | | | |
|---|---|---|---|
| 6,085,226 A * | 7/2000 | Horvitz | 709/203 |
| 6,195,622 B1 * | 2/2001 | Altschuler et al. | 703/2 |
| 6,425,057 B1 * | 7/2002 | Cherkasova et al. | 711/134 |
| 6,438,672 B1 * | 8/2002 | Fischer et al. | 711/210 |
| 6,466,232 B1 | 10/2002 | Newell et al. | |
| 6,487,539 B1 * | 11/2002 | Aggarwal et al. | 705/14 |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbot et al. | |
| 6,812,937 B1 | 11/2004 | Abbott et al. | |
| 6,842,877 B2 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |

OTHER PUBLICATIONS

Hosseini-Khayat, Saied; "Replacement Algorithms for Object Caching"; ACM, 1998; pp. 90-97.*

Eric Horvitz, "Continual Computation Policies for Utility-Directed Prefetching", Seventh ACM Conference on Information and Knowledge Management (CIKM '98), ACM Press, Nov. 3-7, 1998, pp. 175-184.*

Sahami et al.; "A Bayesian Approach to Filtering Junk E-Mail"; AAAI Workshop on Learning for Text Categorization, Jul. 1998, Madison, Wisconsin. AAAI Technical Report WS-98-05; pp. 1-8.*

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer of the 21st Century, Scientific American, Sep. 1991, 8 pages.

Sahni, Approximate algorithms for the 0/1 knapsack problem, J. Assoc. Computing Machinery, 1975, pp. 115-124.

Michael Garey, et al., Computer and intractability: A guide to the theory of NP-Completeness, W.H. Freeman and Company, New York, 1979, 340 pages, pt. 1, 100 pages (front cover-86).

Michael Garey, et al., Computer and intractability: A guide to the theory of NP-Completeness, W.H. Freeman and Company, New York, 1979, 340 pages, pt. 2, 100 pages (87-186).

Michael Garey, et al., Computer and intractability: A guide to the theory of NP-Completeness, W.H. Freeman and Company, New York, 1979, 340 pages, pt. 3, 100 pages (187-286).

Michael Garey, et al., Computer and intractability: A guide to the theory of NP-Completeness, W.H. Freeman and Company, New York, 1979, 340 pages, pt. 4, 56 pages (287-back cover).

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

FIGURE 16

1600
*PROPERTIES OF INTERMEDIATE STORAGE FACILITIES*

| STORAGE FACILITY 1 ID | LATENCY (OR REQUEST TO RECEIVE TIME) OF INTERMEDIATE STORAGE FACILITY 1 | STORAGE FACILITY 1 SIZE |
|---|---|---|
| | 1614a | 1616a |
| ... | ... | ... |
| STORAGE FACILITY 1 ID | LATENCY (OR REQUEST TO RECEIVE TIME) OF INTERMEDIATE STORAGE FACILITY x | STORAGE FACILITY 1 SIZE |

1610a, 1612a — (top row)
1610b — (bottom row)

FIGURE 9

900
*USER TYPE CLASS PROBABILITIES*

| PROBABILITY OF BELONGING TO USER CLASS 1 | ... | PROBABILITY OF BELONGING TO USER CLASS y |
|---|---|---|

800
*USER TYPE CLASSES*

| USER CLASS 1 | ... | USER CLASS y |
|---|---|---|

810

METHODS AND APPARATUS FOR DOWNLOADING AND/OR DISTRIBUTING INFORMATION AND/OR SOFTWARE RESOURCES BASED ON EXPECTED UTILITY

§ 1. BACKGROUND OF THE INVENTION

§ 1.1 Field of the Invention

The present invention concerns intelligently downloading resources, including computational resources, software components, or informational resources for example, from a source to one or more intermediate storage facilities. The present invention also concerns intelligently distributing resources among intermediate storage facilities having different latencies. Finally, the present invention concerns evaluating whether or not to modify the capabilities of (e.g., increase or decrease) intermediate storage facilities.

§ 1.2 Related Art

Often, resources, such as software components, data, or content for example, are downloaded from a source to an intermediate storage facility(ies). Typically, the finite size of the intermediate storage facility(ies) limits the amount of resources that can be downloaded. As such resources are needed, by an executing application program for example, they are then loaded from the intermediate storage facility(ies) to a working storage area. FIG. 1 depicts this relationship between a resource source 110, an intermediate storage facility(ies) 120, and a working storage area 130, all in an environment 100. Naturally, if resources requested by an application are not currently stored at the intermediate storage facility(ies) 120 (when not in the working storage area 130), then they must be obtained from another source.

Further, resources, such as data or instructions for example, may be distributed across a number of intermediate storage facilities having various latencies. For example, computers have used data and instruction caching to download data or instructions from a relatively slow and large storage area (such as a magnetic disk for example) to a relatively fast and small storage area (such as RAM for example) (also referred to as "cache memory"). In this way, the computer's processor can access needed data or instructions from the cache memory, if it is stored there (also referred to as a "hit"); if not (also referred to as a "miss"), it will access the needed data or instructions from the slower larger memory. Some methods have managed the cache memory in an attempt to maximize a ratio of hits to misses. Typically, most recently used data are stored in a cache, and when the cache becomes full, the least recently used data is "flushed" from the cache.

A few environments in which the present invention may operate are introduced below. First, an environment in which software components are installed from a removable mass storage media (such as a compact disk(s) (or "CD") ROM(s), for example) to a non-volatile intermediate storage facility(ies) (such as a hard magnetic disk drive, for example) is introduced in § 1.2.1 below. Second, an environment in which software is loaded onto resident, non-volatile, memory of an un-tethered (or wireless) device, such as a palm computer, a personal digital assistant, a cordless telephone, an information appliance or any other wireless or un-tethered device, is introduced in § 1.2.2 below. Third, an environment having multiple storage facilities having different latencies is introduced in § 1.2.3 below. Fourth, an environment in which software components or multimedia resources are loaded from a source server to a more local intermediate storage facility(ies) is introduced in § 1.2.4 below. Finally, unmet needs in each of the four (4) exemplary embodiments are summarized in § 1.2.5.

§ 1.2.1 First Exemplary Environment

A first exemplary environment, in which software components are loaded from a CD ROM(s) to a hard magnetic disk drive of a personal computer is now introduced. As is known, software is often distributed and sold as computer executable code stored on a CD ROM(s). A computer user often invokes a so-called "installation wizard" which controls the download of software components from the CD ROM to appropriate directories on the hard magnetic disk drive residing on their personal computer. Though the capacity of hard magnetic disk drives has greatly increased over the past decade, and is expected to continue increasing, disk drive resources are finite and often must be rationed. Moreover, to make applications easier to use and to offer users a rich computing experience, the amount of software code in typical applications has also increased over the last decade. Thus, to reiterate, disk drive resources often must be rationed.

As one example, the Microsoft Visual Studio™ development system (from the Microsoft Corporation of Bellevue, Wash.) is used by software developers developing applications for a Microsoft Operating system platform such as Windows® 95 or Windows NT® for example. This product contains about two (2) gigabytes of software. Some personal computers do not have this much magnetic hard disk storage capacity. Even personal computers having a magnetic hard disk drive of two (2) or more gigabytes often have other applications, operating systems, or data which may leave little, or insufficient, disk storage remaining for additional software. Developers may typically only use specific subsets of the software. Thus, it is believed that such developers would like to download only software components that they will need.

In view of the increasing size of software applications and the need to ration disk drive (or other storage facility) resources, some software applications have installation wizards which permit users to load software components for (a) a standard version of the application, or (b) an enhanced or professional version of the application. The standard version of the application is perfectly acceptable for most users and requires less storage space. The enhanced or professional version of the application provides increased functions, but requires more storage space. Moreover, software applications may have installation wizards that permit users to load core software components, which are necessary for the application to operate, and to expressly select additional, non-essential components.

While the foregoing installation wizards have aided many personal computer users in rationing their hard disk (or other storage facility) resources, challenges remain. For example, applications having installation wizards which permit standard or enhanced versions of the application to be installed are limited to two (2) versions of the application and rely on a judgment, made at one time, by the application developer as to what functions most "standard" users will want. Applications having installation wizards which install core software components and selected optional software components rely on a user's selection, which may be uniformed and which may cause confusion and undue anxiety in uniformed users.

Thus, there is a need for methods and apparatus for intelligently downloading software components from a source to an intermediate storage facility(ies). Such methods and apparatus should be as automated as possible thereby relieving users of often difficult or confusing decisions. Moreover, such methods and apparatus should minimize the risk, while conserving magnetic hard disk (or other storage facility) resources, that a user will need a software component that was not installed.

§ 1.2.2 Second Exemplary Environment

In a second exemplary environment, software components, and data such as addresses, telephone numbers, schedules, and to-do lists, for example, are loaded onto an un-tethered device, such as a palm computer, a personal digital assistant, a cordless telephone, or another information appliance. In such cases, the software components and/or data are transferred from a source having less limited storage, such as a desktop personal computer for example. Such un-tethered devices typically have relatively small amounts of available storage. The users of such devices are typically willing to sacrifice storage capacity for the freedom of movement that un-tethered computing devices afford. However, most users would clearly prefer the enhanced functionality and features provided under the operating environments of their desktop computers. To make applications easier to use and to offer users a rich computing experience, the amount of software code in typical applications will undoubtedly increase. However, analogous to the hard magnetic disk drives of personal computers, the storage of such un-tethered devices is finite and often must be rationed.

§ 1.2.3 Third Exemplary Environment

In a third environment, some computers users will have access to more than one disk drive, each of which may have different latencies and different capacities. A user may partition the capacity of these drives into one or more logical drives. When installing software, the software will be stored to a default directory on a default logical drive, unless a user specifies a logical drive and directory at which the software is to be installed. In either case, little, if any, thought is given to optimizing the distribution of software components across various storage devices. The present inventor has recognized that during the installation of software components, it would be advantageous to optimally install the software components on the various disk drives.

§ 1.2.4 Fourth Environment

An exemplary environment in which software components or multimedia resources are loaded from a source server (e.g., an Internet server) to a more local intermediate storage facility(ies) (e.g., a regional proxy server, a resident server, a hard disk drive cache area, etc.) is now introduced.

Recently, to reduce the costs of distributing software, many software producers have been distributing software over the Internet, using the file transfer protocol (of "FTP") for example. Updates and patches to correct "bugs" in the software are also available over the Internet. Often, a download site, as a part of a software producer's home site, is provided at the software producer's Internet site server. In many instances, mirror sites, at various geographic locations, are used to provide the same download capability, but at a site closer to the end user or at a site having more excess capacity to serve download requests. Unfortunately, however, such mirror sites are not tailored to the specific populations of end users in different locations. Rather, as the name implies, the content offered at such sites "mirrors" that found at the download site provided at the software producer's Internet site server.

Regarding content, such as multimedia content, at least one Internet service provider (@HOME Network of Redwood City, Calif.) has built a separate network which parallels the Internet. This separate network uses the same underlying protocols as those used on the Internet to ensure compatibility with the Internet. The @HOME network uses a hierarchical, distributed network architecture with caching and replication facilities, in an effort to ensure that information an end user wants is "close" to that end user. More specifically, the @HOME network employs local caching servers to (i) improve performance by using the cache as a dedicated local server, (ii) reduce the amount of data movement in higher layers of the hierarchical network, and (iii) use usage statistics for tuning performance, tailoring the service, and targeting promotions and advertising. Unfortunately, it is believed that the @HOME network uses rather primitive caching techniques when determining what to download and store at the local caching servers. Moreover, it is believed that such caching is tailored to the specific environment of the @HOME network.

§ 1.2.5 Unmet Needs

In view of the expected increasing size of software applications and the need to ration storage resources, there is a need for methods and apparatus for intelligently installing software components or for intelligently downloading software components and data to un-tethered computing devices. Such methods and apparatus should be as automated as possible thereby relieving users of often uninformed, difficult, or confusing decisions. Moreover, such methods and apparatus should minimize the risk, while conserving storage resources, that a user will need a software component or data that was not downloaded. Further, there is a need for methods and apparatus for intelligently distributing resources among storage facilities having various latencies. Furthermore, there is a need to determine whether or not to change (e.g., increase or decrease) a capacity (or some other characteristic, such as read access time) of an intermediate storage facility.

§ 2. SUMMARY OF THE INVENTION

The present invention provides a resource (also referred to as a "component") download process. This process may include acts of: (i) accepting and/or determining user-based factors (such as user type classes, usage type classes and probabilities that a particular user belongs to the various user type classes, for example); (ii) accepting and/or determining resource-based factors (such as application classes, whether or not the resource is a component of an application class and if so, whether it is a "core" component or an "optional" component, and usage statistics for the resource, e.g., for different user classes, for example); and (iii) maximizing the expected value of downloading resources (or minimizing the expected costs associated with going back to a resource source).

The present invention also provides a resource (also referred to as a "component") distribution process. Basically, this process includes acts of: (i) accepting and/or determining user-based factors (such as user type classes, usage type classes and probabilities that a user belongs to the various user type classes, for example); (ii) accepting and/or determining resource-based factors (such as application classes, whether or not the resource is a component of an application class and if so, whether it is a "core" component or an "optional" component, and usage statistics for the resource (such as a frequency of expected use of a resource by a user of a particular user class type, for example); (iii) accepting and/or determining intermediate-storage-facility-based factors (such as the size and latencies of various intermediate storage facilities, for example); and (iv) minimizing the total expected latencies between requesting and receiving resources. The expected latency may be a function of the number of times a resource is requested and the request-to-receive time latency in each case.

The present invention also provides a resource (also referred to as "component") distribution method which may be used to determine whether or not to add an instance of a component to an intermediate storage facility, such as a caching server for example. This method may include determining value densities of adding the resource and maximizing value densities given a constraint of the intermediate storage facility. The value density may be a function of a value of storing the component and a cost of storing the component. The cost of storing the component may simply be a function of the size of the component. The value of storing the component may be a function of perceived utility per use of the component and a frequency of use of the component. The perceived utility per use of the component may be a function of a change in request-to-receiver time which may in turn be a function of storage device read access speed, network speed, network latency, and component size. Again, the component size is known. The network speed may be a function of the lowest bandwidth link between the intermediate server and the end user, which is often a function of a configuration (e.g., dial up modem, ISDN modem, cable modem, DSL, etc.) of the end user. The network latency may be a function of a number of hops (e.g., routers) between the intermediate server and the end user and handshaking delays to set up and maintain communications between the intermediate server and the end user. Finally, the frequency of use may be a function of classes of user types and a number of users per class type. Many of these values may be measured and/or inferred.

In each of the foregoing examples, a value was maximized given a constraint of an intermediate storage facility. The present invention also provides methods and apparatus for determining whether or not to change the constraint of the intermediate storage facility based on a change in value and cost.

§ 3. BRIEF DESCRIPTION OF THE DRAWINGS

FIG. 8 depicts exemplary user type class data which may be used by the present invention.

FIG. 9 depicts exemplary user type class probability data which may be used by the present invention.

FIG. 16 depicts exemplary intermediate storage facility information which may be used by at least one aspect of the present invention.

§ 4. DETAILED DESCRIPTION

The present invention concerns novel methods, apparatus, and data structures for intelligently downloading resources, such as software components for example, from a source to one or more intermediate storage facilities and for intelligently distributing resources among storage facilities having different latencies. The following description is presented to enable one skilled in the art to make and use the invention, and is provided in the context of particular applications and their requirements. Various modifications to the disclosed embodiment will be apparent to those skilled in the art, and the general principles set forth below may be applied to other embodiments and applications. Thus, the present invention is not intended to be limited to the embodiments shown. The inventor regards his invention as any patentable subject matter described herein.

Functions which may be preformed by the present invention are first presented in § 4.1 below. Then, exemplary structures and methodologies for practicing the present invention are presented in § 4.2 below. Finally, exemplary operations of the present invention in various exemplary embodiments are presented in § 4.3 below.

§ 4.1 Functions

Figure 2:
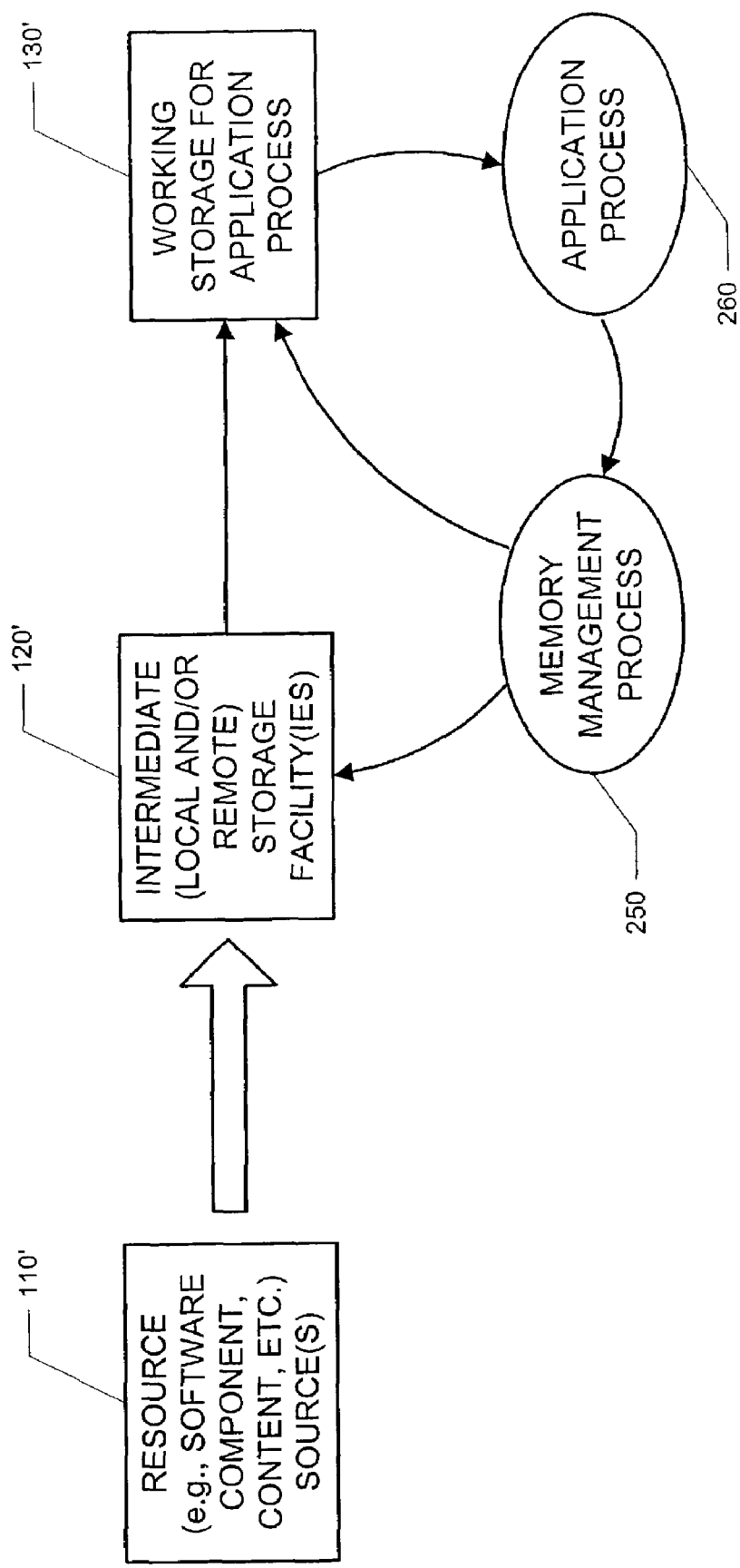
FIG. 2 is a high level block diagram of an environment in which the present invention may operate.

FIG. 2 is a high level block diagram of an environment 200 in which the present invention may operate. As shown in FIG. 2, an intermediate storage facility(ies) 120' stores resources from a source(s) 110'. An application process (or, more generally, an "application") 260 may request a resource (such as a software object, stored instructions, a text file, an image file, a video file, and audio file, or any other type of resource, for example). Such a resource request may be handled by a memory management process (or, more generally, a "memory manager") 250. More specifically, when the memory management process 250 receives a resource request from the application process 260, it will determine whether or not the requested resource is available from the working storage 130'. If so, the requested resource is provided from the working storage 130' to the application process 260. Otherwise, if the requested resource is stored at the intermediate storage facility(ies) 120', it is provided from the intermediate storage facility(ies) 120' to the application process 260, either directly or via the working storage 130'. Note that at some point, the requested resource will have been installed or downloaded from a source(s) 110' to the intermediate storage facility(ies) 120'.

Still referring to FIG. 2, one or more basic functions may be performed by the present invention. First, the present invention may function to maximize a value of resources stored at the intermediate storage facility(ies) 120'. This aspect of the present invention will be introduced in § 4.1.1 below. Second, the present invention may function to minimize request-to-receive times related to the receipt of requested resources from one of a number of intermediate storage facilities 120'. Note that this function differs from traditional caching which seeks to maximize a hit-to-miss ratio that the requested resource will be in a cache, such as the working storage 130' for example. This second aspect of the present invention will be introduced in § 4.1.2 below. Finally, the present invention may function to change (e.g., increase or decrease) a capacity (or some other characteristic, such as read access time) of an intermediate storage facility based on a change in value and cost associated with such a change.

§ 4.1.1 Maximizing Value of Resources Stored at the Intermediate Storage Facility(ies)

As introduced above, the present invention may function to maximize a value of resources stored at the intermediate storage facility(ies) 120'.

For example, in the context of installing software components from a source 110', such as a CD ROM(s) for example, to an intermediate storage facility, such as a magnetic hard disk for example, the "value" associated with the availability of software components installed on the magnetic hard disk (or an intermediate storage facility) is to be maximized. Maximizing this "value" may be characterized in terms of minimizing the likelihood that a needed component will not have been installed, while conserving space of the magnetic hard disk (an intermediate storage facility). Thus, the "value" may be proportional to a probability that a software component will be used at least once during a product life and may be inversely proportional to a storage requirement (that is, a size) of the component. Note that the cost for later installation may be assumed to be the same for each component, regardless of size, should the components all be available at the same source location, since the time to find and load a CD ROM and to start an installation procedure is generally much greater than the time difference to copy differently sized software components from a CD ROM to a hard magnetic disk.

To determine a probability that a software component will be used at least once during the life of a product, the present invention may (i) accept and/or determine user-based factors (such as a set of user type classes and a probability that a user is a member of each user type class, for example), and (ii) accept and/or determine resource-based factors (such as a set of application classes, for each of the application classes, enumerated resources that belong to that application class, for each application class, member resources identified as "core" or "optional" for example), and (iii) accept and/or determine probabilistic relationships among application classes, resource usage and user type classes.

In another example, in the context of downloading resources to an un-tethered computing appliance, a similar value is determined. However, in this case, the value will be proportional to a probability that a resource will be used at least once before the next scheduled or expected "docking" of the un-tethered computing appliance. To determine this probability, the present invention may (i) accept and/or determine user-based and use-based factors, (ii) accept and/or determine resource-based factors, and (iii) accept and/or determine probabilistic relationships among resource type classes, user type classes, and usage type classes. Such information may be gathered by monitoring a user or user's patterns of information access and docking based on such distinctions as time of day, day of week, and indications about events indicated in an online calender. In one approach to valuation of components in this setting, it is assumed that components that are needed but that are not stored locally lead to incurring a cost of docking the system. For such a valuation model, the cost for not having a requested resource may be assumed to be the same for each resource regardless of size, since the cost of prematurely "re-docking" an un-tethered device to a docking station is much greater than the time difference to copy differently sized resources to an intermediate storage facility of the un-tethered device. In another model of value, for each item, the specific costs costs incurred with the delayed access of each component that becomes needed but that is unavailable in an untethered setting is considered. For such a model, an invariant cost function can be assumed. Alternatively, a context and/or component-specific costs can be used. Further, both the premature docking costs and the cost of delay can be considered together by representing the probability that a user would do additional work to redock a computer should a missing component turn out to be needed.

§ 4.1.2 Optimizing Distribution Over Intermediate Storage Facilities to Minimize Total Request-to-Receive Times Assuming that the intermediate storage facilities 120' include multiple storage facilities having different request-to-receive times, the present invention may also function to minimize request-to-receive times related to the receipt of requested resources from the intermediate storage facilities 120'.

For example, in the context of distributing software components across multiple storage facilities, the "value" may be to minimize expected costs over populations of users. The expected costs may be a function of relative request-to-receive times of storage facilities and frequency of resource use. Thus, a value of moving a resource from a slower storage facility to a faster storage facility may be proportional to an expected frequency of use of the resource and a difference in request-to-receive times between the slower and faster storage facilities, and may be inversely proportional to a size of the resource. Note that since the difference in request-to-receive times between the slower and faster storage facilities may depend on the size of the resource, the value of moving a resource from the slower storage facility to the faster storage facility may simply be proportional to the expected frequency of use of the resource and a difference in nominal (that is, for a normalized resource) request-to-receive times between the slower and faster storage facilities.

The present invention may predict the expected frequency of use of a software component by (i) accepting and/or determining user-based factors (such as a set of user type classes and a probability that a user is a member of each of the user type classes, for example), (ii) accepting and/or determining resource-based factors (such as, a set of application classes, for each of the application classes, enumerated resources that belong to that application class, for each application class, member resources identified as "core" or "optional", for example), and (iii) accepting and/or determining probabilistic relationships among various factors (such as between application classes, resource usage and user type classes, and a mean number of times each resource will be accessed, for example).

In the context of optimally distributing resources in a network, the "value" will be similar to that determined above except that (i) the expected frequency of use of a resource may be based on a "composite user" (or composite client) rather than a single user and may be determined for various time periods, (ii) the request-to-receive times may be average request-to-receive times experienced by a "composite user" (or composite client) (iii) the request-to-receive time of a storage facility may change as the number of resources stored at that storage facility changes, and (iv) the request-to-receive times may be determined for various "loads" at various time periods.

Alternatively, the value density may be the expected value of storing a component divided by the expected cost of storing the component. The cost of storing the component may be a function (e.g., a linear function) of the size of the component. The value of storing the component may be a perceived utility of storing the component, per request of the component and a frequency of requests for the component. The frequency of requests of the component may be measured and/or predicted, and may be a function of classes of user types and number of users per class type. The perceived utility may be a function of the change in request-to-receive time, which in turn may be a function of a change in storage device read access speed, change in network speed, change in network latency, and a size of the component. The network speed may be a function of the lowest bandwidth link between the intermediate storage facility and the user which, in many instances, is the link from the user. Thus, the network speed (and therefore, change in request-to-receive time, perceived utility, and value) may be a function of a user configuration, such as a dial up modem user, a cable modem user, a DSL user, an ISDN user, etc. The network latency may be a function of a number of hops (e.g., routers) between the storage facility and the user, and a handshaking delay for communications set up and maintenance.

§ 4.1.3 Changing a Capacity (or Some Other Characteristic) of an Intermediate Storage Facility Based on the Value and Costs Associated with Such a Change In each of the foregoing functions that may be performed by the present invention, a value was maximized given a constraint of an intermediate storage facility. The present invention may also function to determine whether or not to change the constraint (e.g., storage capacity) of the intermediate storage facility based on an associated change in value and cost.

Having introduced functions which may be performed by the present invention, structures, methodologies, and processes for effecting these functions are described in § 4.2 below.

§ 4.2 Structures/Methodologies/Data Structures/Processes

The structures, methodologies, data structures and processes of the present invention are first described in the context of a general, high level, environment in § 4.2.1 below. Then, the structures, methodologies, data structures and processes of the present invention are described in the context of four (4) exemplary environments in §§ 4.2.2 through 4.2.5 below.

§ 4.2.1 High Level—Generic Application

§ 4.2.1.1 Environment

Figure 1:
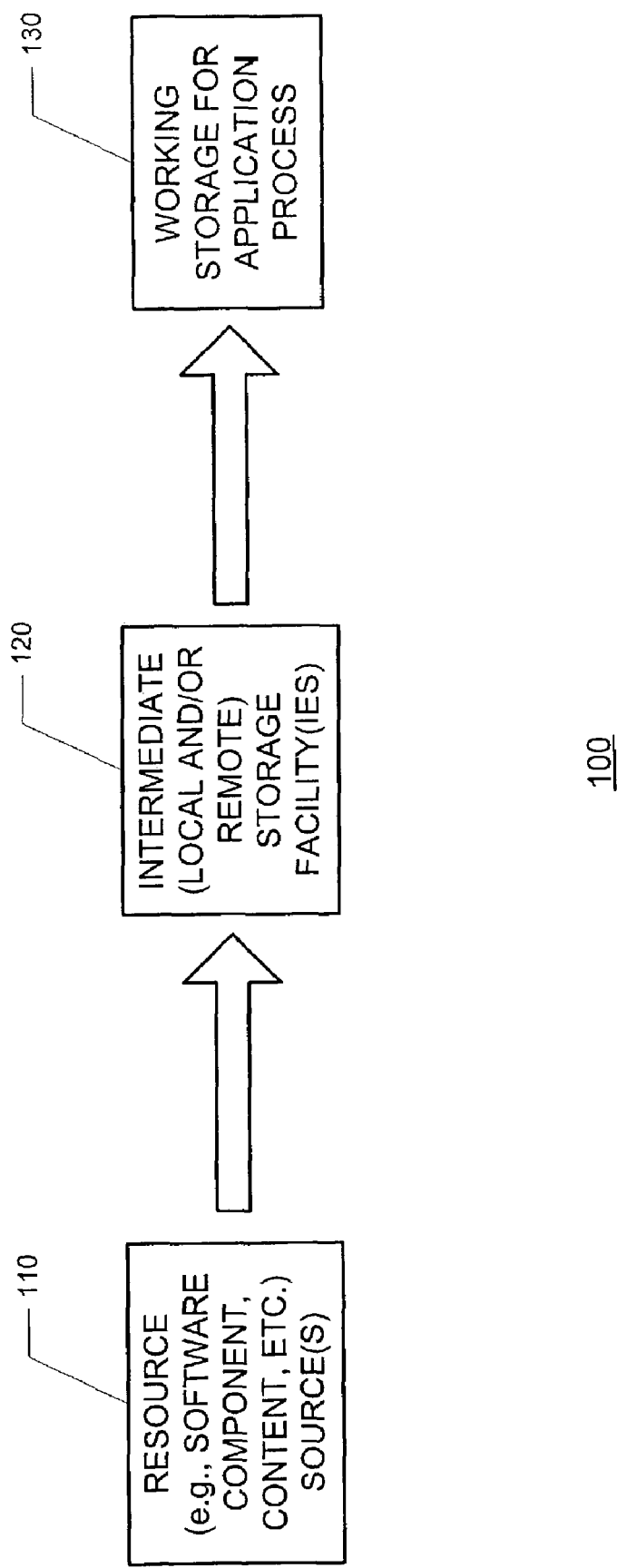
FIG. 1 is a high level block diagram of an environment, at a very abstract level, in which the present invention may operate.

As discussed above with reference to FIGS. 1 and 2, an environment 200 in which the present invention may operate may include an intermediate storage facility(ies) 120' which stores resources from a source(s) 110'. An application process (or, more generally, an "application") 260 may request a resource (such as a software object, stored instructions, a text file, an image file, a video file, and audio file, or any other type of resource, for example). Such a resource request may be handled by a memory management process (or, more generally, a "memory manager") 250. More specifically, when the memory management process 250 receives a resource request from the application process 260, it will determine whether or not the requested resource is available from the working storage 130'. If so, the requested resource is provided from the working storage 130' to the application process 260. Otherwise, if the requested resource is stored at the intermediate storage facility(ies) 120', it is provided from the intermediate storage facility(ies) 120' to the application process 260, either directly or via the working storage 130'.

Note that at some point, the requested resource I will have been installed from a source(s) 110' to the intermediate storage facility(ies) 120'. Assuming that available capacity of the intermediate storage facility(ies) 120' is limited, the first issue is to determine which resources to store at the intermediate storage facility(ies) 120'. This determination may be referred to as the "download decision" function of the present invention. Exemplary environments in which download decisions are performed are described in §§ 4.2.2 and 4.2.3 below. Next, assuming that a number of different intermediate storage facilities 120' having different request-to-receive times are provided, a second issue is to determine how to distribute various resources among the various intermediate storage facilities 120'. This determination may be referred to as the "distribution decision" function of the present invention. Exemplary environments in which distribution decisions are performed are described in §§ 4.2.4 and 4.2.5 below.

The present inventor recognized that both the download decision and distribution decision functions of the present invention may be thought of as variants of "knapsack" problems in which the choosing of components beyond traditionally considered deterministic values is generalized so as to now maximize the expected utility of having components cached, or to minimize the expected costs associated with the allocation of available storage resources, based on consideration of probabilities and/or expected values associated with items. Although knapsack problems, as well as algorithms for their solution or approximate solution, are well known (See, for example, the text: Michael R. Garey and David S. Johnson, *Computers and Intractability: A Guide to the Theory of NP-Completeness*, pp. 247-8, W. H. Freeman and Co., New York (1979)), the knapsack problem is introduced for the reader's convenience. The knapsack problem may be stated as follows. Given a finite set R of members r, a size s(r) for each member r of the set R, and a value v(r) for each member r of the set R, is there a subset $R' \subseteq R$, such that the sum of all of the sizes of the members of R' is less than or equal to a size constraint B and such that a sum of all of the values of the members of R' is is maximized (or at least greater than or equal to a value goal). These conditions can be expressed as:

$$\sum_{r \in R'} s(r) \leq B; \text{ and} \quad (1)$$

$$\sum_{r \in R'} v(r) \geq K \quad (2)$$

To convert this general problem to an optimization problem, the sum of all of the values of the members of R' is to be maximized. That is, the value of items (r) placed in a "knapsack" (R') is to be maximized subject to the constraint that the total size of all of the items is not to exceed the capacity (B) of the knapsack.

In the context of the present invention, the set R can be thought of as a universe of resources, the size s(r) can be thought of as a size (or footprint) of a resource, and the size constraint B can be thought of as the size or available capacity of the intermediate storage facility(ies) or the size of a particular one of the intermediate storage facilities. As will be appreciated from the following description, the value v(r) and the value sought to be optimized is the expected value, which will depend on an environment in which the present invention will be operating and goals of that environment.

Knapsack problems are difficult to solve, and are referred to as an "NP complete" problems. There are several algorithms for approximating the solution of knapsack problems in polynomial, rather than exponential, time. The present invention may use a "greedy" approximation algorithm described in more detail below. Naturally, the present invention may use other known, publicly available, or proprietary algorithms for solving, or for obtaining an approximate a solution to, knapsack problems.

§ 4.2.1.2 Methods—High Level

Having described the general download and distribution decision functions of the present invention, exemplary methods for performing the download and distribution decision functions are now described with reference to FIGS. 3 and 4, respectively.

Figure 3:
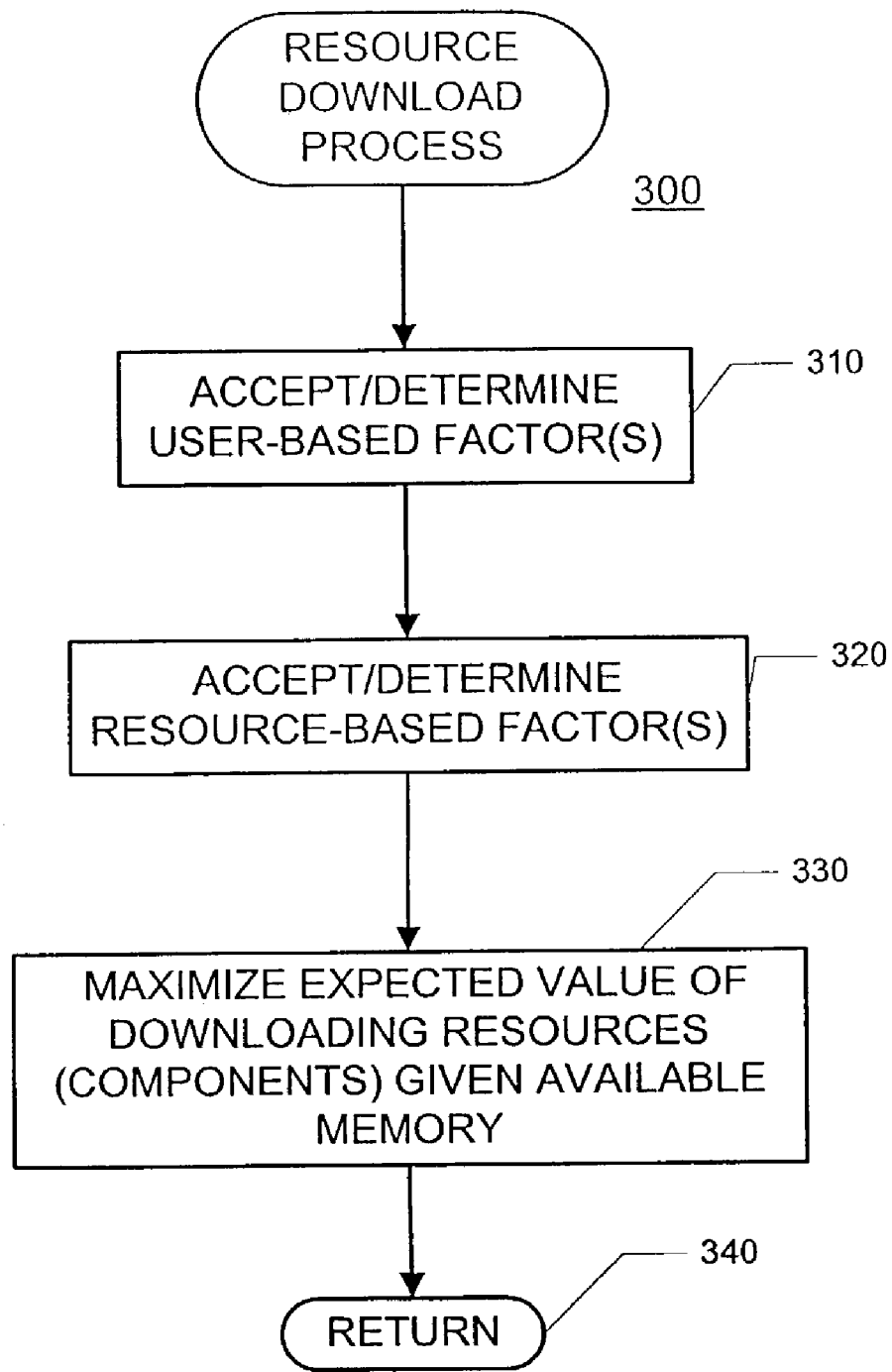
FIG. 3 is a flow diagram of an exemplary method for performing a download (or installation) decision process which may be used by the present invention.

FIG. 3 is a high level flow diagram of an exemplary method 300 for performing a resource (also referred to as a "component") download process. First, as shown in act 310, user-based factors are accepted and/or determined. User-based factors may include user type classes, usage type classes and probabilities that a particular user belongs to the various user type classes. Next, as shown in act 320, resource-based factors are accepted and/or determined. Resource-based factors may include application classes, whether or not the resource is a component of an application class and if so, whether it is a "core" component or an "optional" component, and usage statistics for the resource (among users in general, or among users of the various user type classes). Finally, as shown in act 330, the expected value of downloading resources is maximized (or the expected costs of going back to a resource source is minimized), given storage constraints, and the process 300 is left via return node 340.

Figure 4:
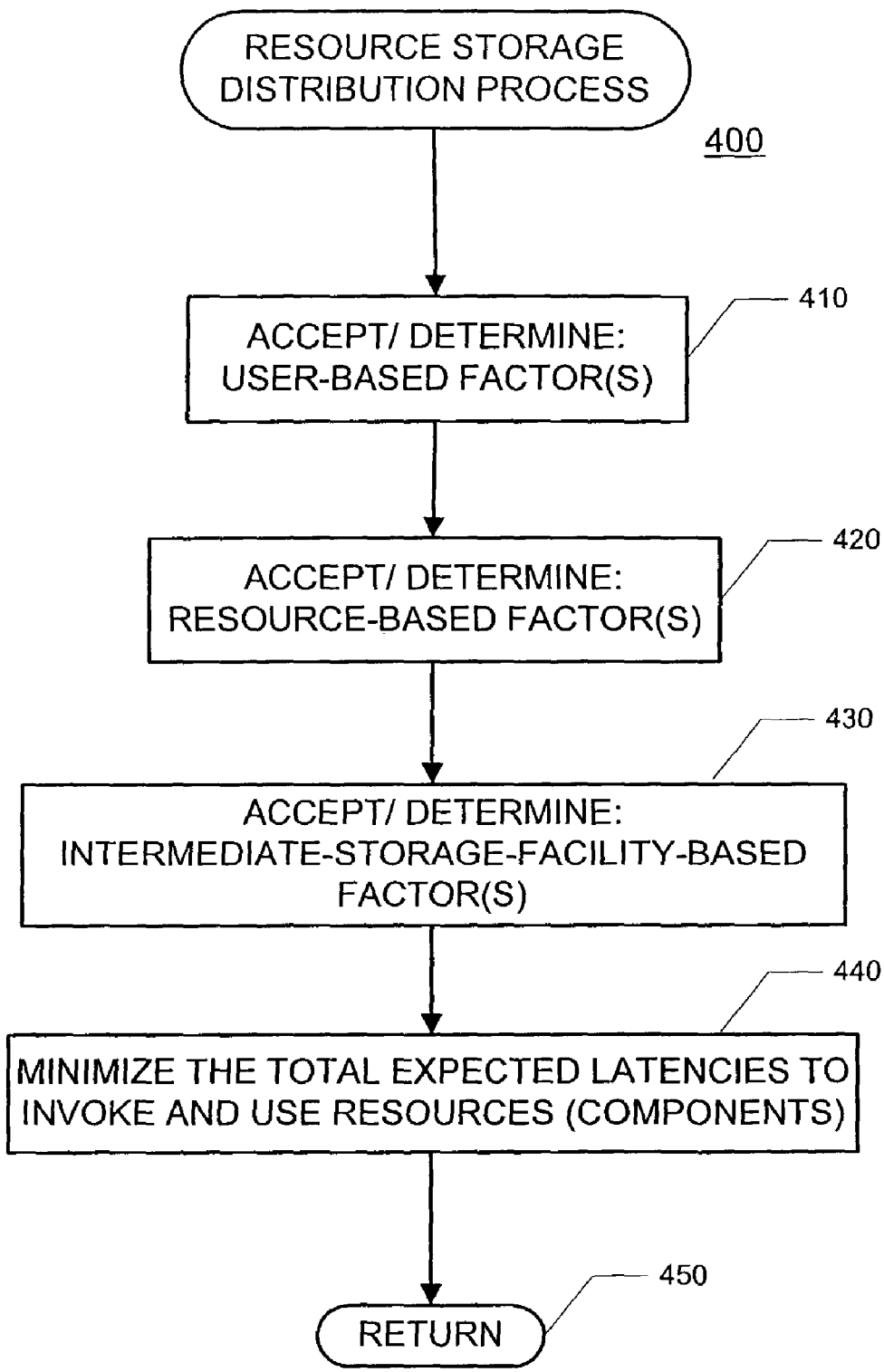
FIG. 4 is a flow diagram of an exemplary method for performing a distribution decision process which may be used by the present invention.

FIG. 4 is a high level flow diagram of an exemplary method 400 for performing a resource (also referred to as a "component") distribution process. First, as shown in act 410, user-based factors are accepted and/or determined. To reiterate, user-based factors may include user type classes, usage type classes and probabilities that a user belongs to the various user type classes. Next, as shown in act 420, resource-based factors are accepted and/or determined. Resource-based factors may include application classes, whether or not the resource is a component of an application class and if so, whether it is a "core" component or an "optional" component, and usage statistics for the resource (such as a frequency of expected use of a resource by a user of a particular user class type). Then, as shown in act 430, intermediate-storage-facility-based factors are accepted and/or determined. These factors may include the size and latencies of various intermediate storage facilities. Finally, as shown in act 440, the total expected latencies between requesting and receiving resources is minimized and the process 400 is left via return node 450. Note that expected latency may be a function of the number of times a resource is requested and the request-to-receive time latency in each case.

§ 4.2.1.3 Architecture

Figure 5:
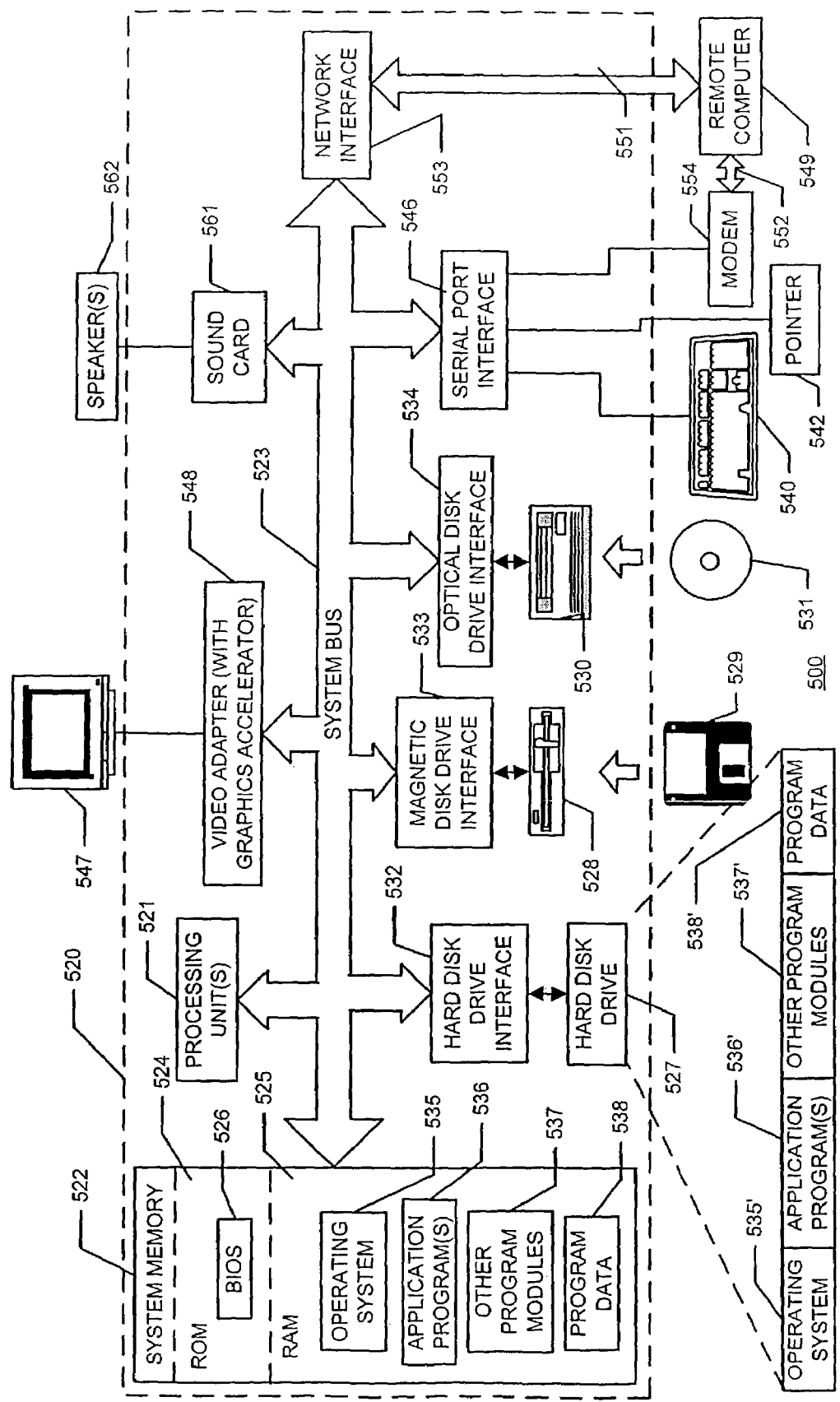
FIG. 5 is a block diagram of an exemplary personal computer which may be used to perform at least some aspects of the present invention.

FIG. 5 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device in the form of a conventional personal computer 520. The personal computer 520 may include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory may include read only memory (ROM) 524 and/or random access memory (RAM) 525. A basic input/output system 526 (BIOS), containing basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 523, magnetic disk 529, (magneto) optical disk 531, ROM 524 or RAM 525, such as an operating system 535, one or more application programs 536, other program modules 537, and/or program data 538 for example. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system bus 523 via an interface, such as a video adapter 548 for example. In addition to the monitor 547, the personal computer 520 may include other peripheral output devices, such as speakers 562 and printers (not shown) for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 6:
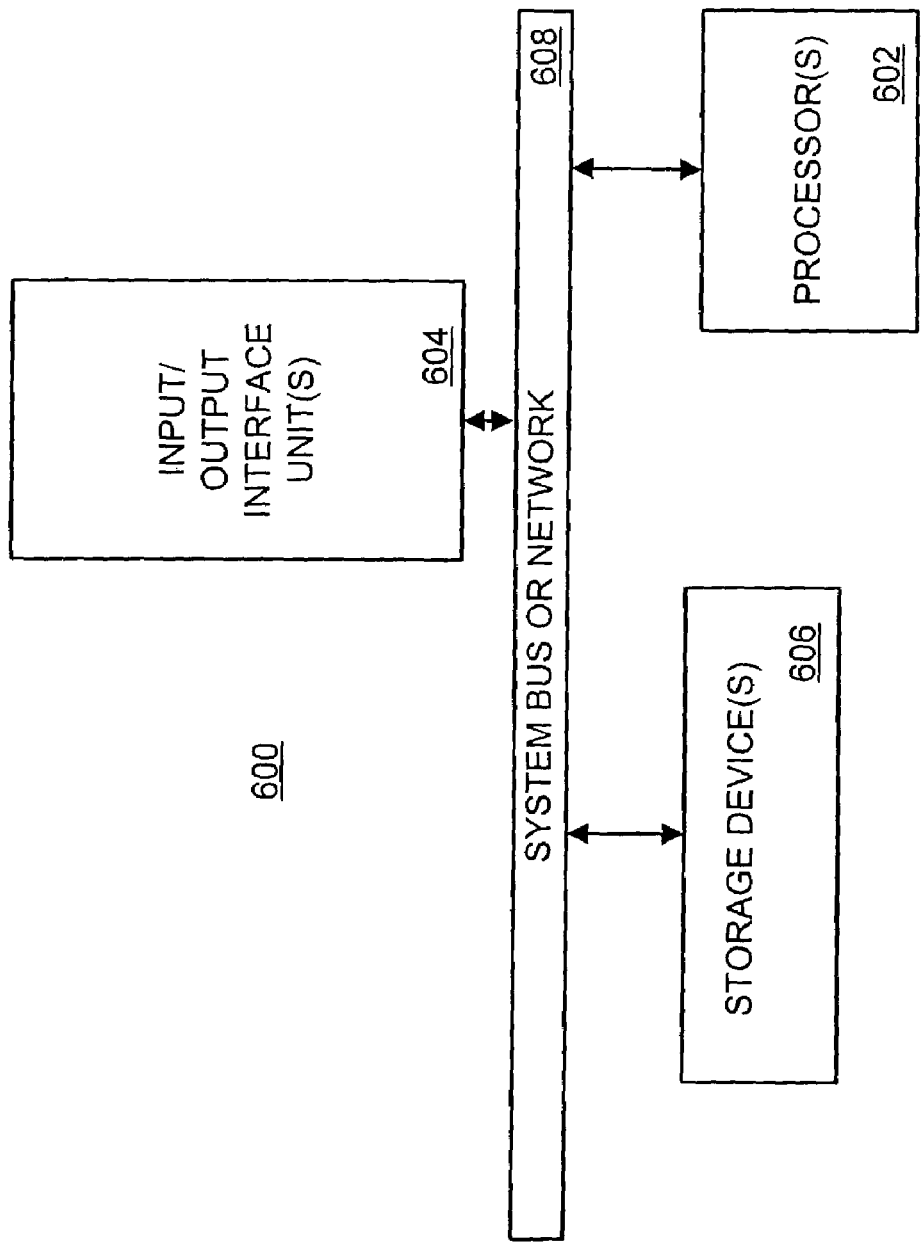
FIG. 6 is a high level block diagram of an exemplary machine which may be used to perform at least some aspects of the present invention.

FIG. 6 is a more general machine 600 in which at least some aspects of the present invention may be implemented. The machine 600 basically includes a processor(s) 602, an input/output interface unit(s) 604, a storage device(s) 606, and a system bus or network 608 for facilitating data and control communications among the coupled elements. The processor(s) 602 may execute machine-executable instructions to effect one or more aspects of the present invention. At least a portion of the machine executable instructions may be stored (temporarily or more permanently) on the storage devices 606 and/or may be received from an external source via an input interface unit 604.

Having described exemplary apparatus in which at least some aspects of the present invention may be implemented, exemplary environments in which the download and/or distribution decision functions of the present inventions may be performed are described below in §§ 4.2.2, 4.2.3, 4.2.4, and 4.2.5.

§ 4.2.2 First Exemplary Environment: Installing Software Components from a CD-ROM Recall that in many instances, software components are loaded from a CD ROM(s) to a hard magnetic disk drive of a personal computer. As is known, software is often distributed and sold as computer executable code stored on a CD ROM(s). A computer user often invokes a so-called "installation wizard" which controls the installation of software components from the CD ROM(s) to the hard magnetic disk drive residing on their personal computer. As one example, the Microsoft Visual Studio™ development system (from the Microsoft Corporation of Bellevue, Wash.) is used by software developers developing applications for a Microsoft Operating system platform such as Windows® 95 or Windows NT®. This product contains about two (2) gigabytes of software. Some personal computers do not have this much magnetic hard disk storage capacity. Even personal computers having a magnetic hard disk drive of two (2) or more gigabytes often have other applications, operating systems, or data which may leave little, or insufficient, disk storage remaining for additional software. Below, an environment in which software components are installed from a CD ROM(s) to one or more hard disk drives is described, with reference to FIG. 7, in § 4.2.2.1. Exemplary data structures for storing data used in this environment are described, with reference to FIGS. 8, 9, 10, and 11 in § 4.2.2.2 below. Finally, an exemplary method for performing the download decision function (in this case, a software component installation) of the present invention in this environment is described, with reference to FIG. 12, in § 4.2.2.3 below.

§ 4.2.2.1 Environment

Figure 7:
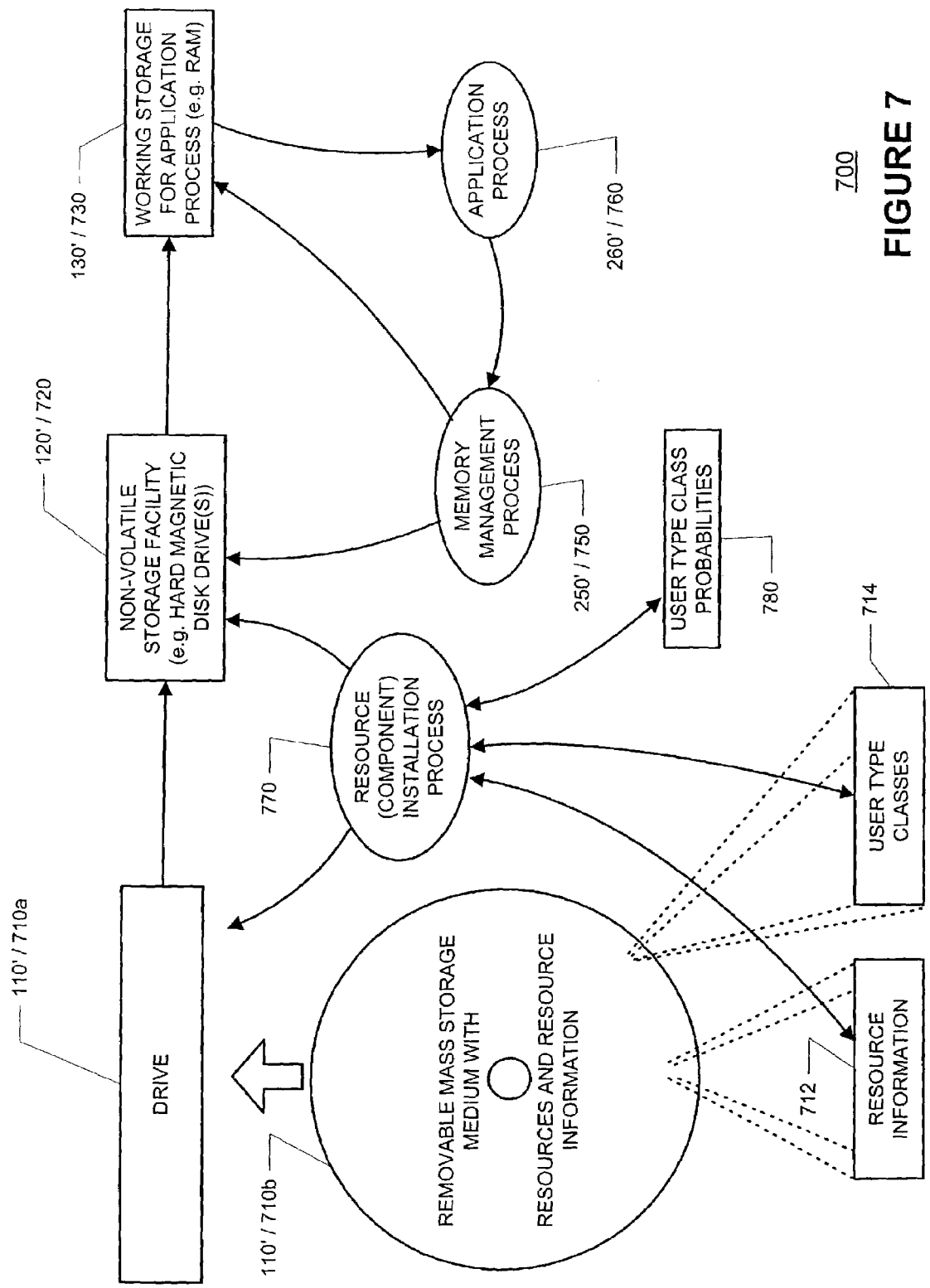
FIG. 7 is a high level block diagram which illustrates the operation of the present invention in a first exemplary environment.

FIG. 7 is a high-level diagram which illustrates an environment 700 in which the present invention can be used to determine which software components (or more generally, resources) to install from a source (such as a CD ROM for example) 110'/710b to an intermediate non-volatile (or more generally, intermediate) storage facility (such as a hard disk drive for example) 120'/720. It is expected that an application process 260'/760 will use one or more of the installed software components. A memory management process 250'/750 will manage the retrieval of software components, or other resources, requested by the application process 260'/760. Thus, referring to both FIGS. 1 and 7, the CD ROM 110'/710b and its drive 110'/710a can be thought of as a resource source 110, the non-volatile storage facility, such as a hard magnetic disk drive for example, 120'/720 can be thought of as an intermediate storage facility 120, and the working storage for the application processes, such as RAM for example, 130'/730 can be thought of as working storage 130.

The component installation process 770 will perform at least some aspects, namely a download determination function, of the present invention. That is, the component installation process 770 determines which software (or other) components of the CD ROM(s) 110'/710b to install onto the non-volatile storage facility 120'/720.

In this exemplary environment, it will be assumed that there will be a relatively high cost for locating and initiating a download of resources, such as software components for example, from a CD ROM-based source 110'/710b. That is, once software components have been installed from the CD ROM 110'/710b to the non-volatile storage facility 120'/720, it may be difficult to later locate and load the CD ROM 110'/710b if more resources are needed from it. Thus, as will be described below, the component installation process 770 will be concerned with the probability that a software component will be used at least once during the life of an application, in order to minimize the expected number of times that a user will be forced to go back to a CD or network-based distribution source.

As shown in FIG. 7, the component installation process may consider resource information 712, which may reside on the CD ROM 110'/710b for example, user type classes 714, which may also reside on the CD ROM 110'/710b for example, and probabilities that a user belongs to the various user type classes 780, which may reside on a resident memory, such as the non-volatile storage facility 120'/720 for example. Exemplary data structures for storing the resource information 712, the user type classes 714, and the user type class probabilities 780 will now be described in § 4.2.2.2 with reference to FIGS. 8, 9, 10, and 11.

§ 4.2.2.2 Data Derivation and Data Structures

As discussed above, the component installation process 770 may consider a number of factors which may be thought of as resource information 712, user type classes 714, and user category probabilities 780. Exemplary ways to access and/or determine this data are described in § 4.2.2.2.1. Exemplary data structures for storing this data are described in § 4.2.2.2.2.

§ 4.2.2.2.1 Accessing and/or Determining Data

Since it is assumed that the cost of locating and initiating a download from a CD ROM-based source is high, one of the goals of the component installation process 770 is to minimize the probability that a user will have to incur the expense of not having a resource, such as a software component for example, available when it is needed by the application process 260'/760.

Although this problem can be solved for a specific case in which it is assumed that all users are the same, in this example, it will be assumed that different types of users will have different probabilities of using a resource, such as a software component for example, at least once during a life of a product. Thus, a set of mutually exclusive and exhaustive classes of user type is sought. This set of user type classes can be estimated by experts or may be learned from a learning machine, such as a cluster analyzer for example. As an example, if the users are developers using Microsoft Visual Studio™, the user type classes may include "heavy-duty Internet developer", "database developer", "application developer", "multimedia developer", "intranet—light database developer", "intranet—heavy database developer", "Java tools only developer", and "wants everything". Naturally, the various user type classes may be different for different applications. For example, if the resources being downloaded are libraries of mathematical algorithms, the user type classes may be related to various fields of math that people may concentrate in. If, on the other hand, the resources are various maps of the country, the user type classes may be related to areas of the country at which people may reside.

The probabilistic information about component usage patterns conditioned on such distinctions as user, context, or such additional variables such as pattern of recent usage, etc., can be assessed using (a) probability assessment by experts, (b) information collected in statistical studies of actual usage by some sample set of users, or (c) combinations of expert judgment and statistical information. If combinations of expert judgment and statistical information are used, the probabilistic assessments of experts may be updated with statistical information gathered later, or may be combined with statistical information at the outset.

A set of application classes may also be sought, and will typically be determined based on expert assessment. For each of the application classes, the distinct resources, such as software components for example, comprising the application class are enumerated and may be marked as "core" (or essential) resources or "optional" resources. Again, this enumeration and marking may be performed based on an expert assessment.

Figure 11:
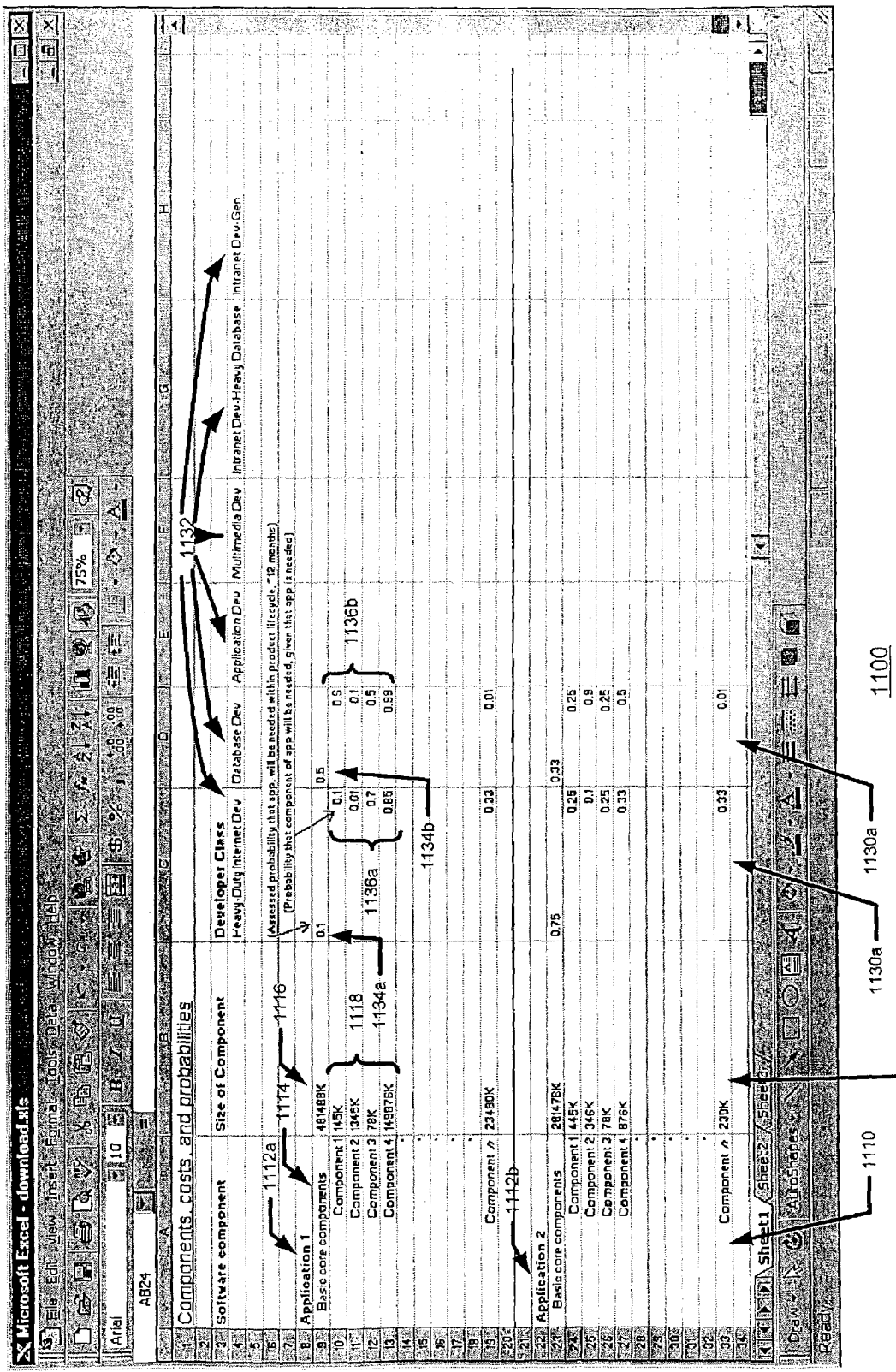
FIG. 11 is a spreadsheet of information which may be used by a component installation process using a download decision function of the present invention.

FIG. 11 is a spreadsheet 1100 containing information which may be used by the component installation process 770. A first column 1110 of the spreadsheet 1100 lists applications 1112 and the basic or core 1114 and optional 1117 resources or components of each of the applications. A second column 1120 includes, for each of the applications 1112, a size 1116 of its core components 1114 and sizes 1118 of its optional components 1117.

Further columns 1130 are provided for each of the user type classes 1132. For each of the user type classes 1132, a probability 1134 that a user, belonging to the user type class, will use the core components of the application is assessed. More specifically, the probability that the application 1112 will be used at least once during a lifecycle of a product, such as the application process 260'/760 for a user type class is determined. Given uncertainty over the user's user type class, this probability may be expressed as:

$$p(\text{Application Used} \geq 1) = \sum_{i \in \text{all user type classes}} p(\text{Application Used} \geq 1 \mid \text{User Type Class}_i, E) \times p(\text{User Type Class}_i \mid E) \quad (3)$$

where E refers to as observed evidence collected about the user or situation. To reiterate, the probabilities that an application will be used at least once by a user in the various user type classes may be assessed by an expert, or collected through empirical observation of a sample set of users and contexts. For simplicity, we shall leave out the mention of conditioning on evidence E in the following equations.

For each application, the conditional probabilities 1136 that optional resources or components associated with the application will be used at least once, assuming that the application is used, may also be determined for each user type class. Each of these probabilities can be determined by a product of the probability that an application will be used and the conditional probability that an optional resource or component will be used, given that the application is used, and therefore may be expressed as:

$$p(\text{Component Used} \geq 1) \sum_{i \in \text{All User Types Classes}} \sum_{j \in \text{All applications}} \quad (4)$$

$p(\text{Component Used} \geq 1 \mid \text{Application Used},$ $\text{User Type Class}_i) \times p(\text{Application Used}) \geq 1 \mid$ $\text{User Type Class}_i) \times p(\text{User Class Type}_i)$ To reiterate, the probabilities that a (optional) component of an application will be used at least once by a user in the various user type classes may be assessed by an expert, or learned from statistical observation of a sample of users and contexts. If it can be assumed that the probability that an optional resource or component is used given that an application is used, is independent of user class type, then the conditional probability that the optional resource or component will be used may be expressed as:

$$p(\text{Component Used} \geq 1) \sum_{i \in \text{User Types Classes}} \sum_{j \in \text{All applications}} \quad (5)$$
$$p(\text{Component Used} \geq 1 \mid \text{Application Used}) \times$$
$$p(\text{Application Used} \geq 1 \mid \text{User Type Class}_i) \times$$
$$p(\text{User Class Type}_i)$$

Given the set of user class types, the set of applications, and probabilities that a users of a particular class type will use particular components of applications at least once, probabilities that a user belongs to the particular user type classes (P(User Type Class$_i$)) is also sought. One possible approach to inferring this probability is to develop Bayesian dependency models, known as "Bayesian networks". Such models may consider sets of evidence including, for example, (i) answers to questions (such as, regarding the user's background, interests, type of development, etc., for example) which may be generated by the component installation process 770 at the time of installation, (ii) software applications and components preexisting on the user's computer at the time of installation, and (iii) hardware indicators (such as amount of RAM, generation or type of CPU, video drivers, video memory, etc., for example) stored on the user's computer. The Bayesian network specifies that the user type class influences the probability distributions over the evidence. At run time, one or more pieces of evidence are considered and the Bayesian inference system generates a set of probabilities of the user belonging to the various user type classes. Performing such inferences is compatible with a user directly specifying which applications, or resources or components it wants. In such instances, the explicitly requested applications will be loaded and the download determination function of the present invention will only be performed on non-specified applications or optional resources or components.

§ 4.2.2.2.2 Data Structures

Figure 10:
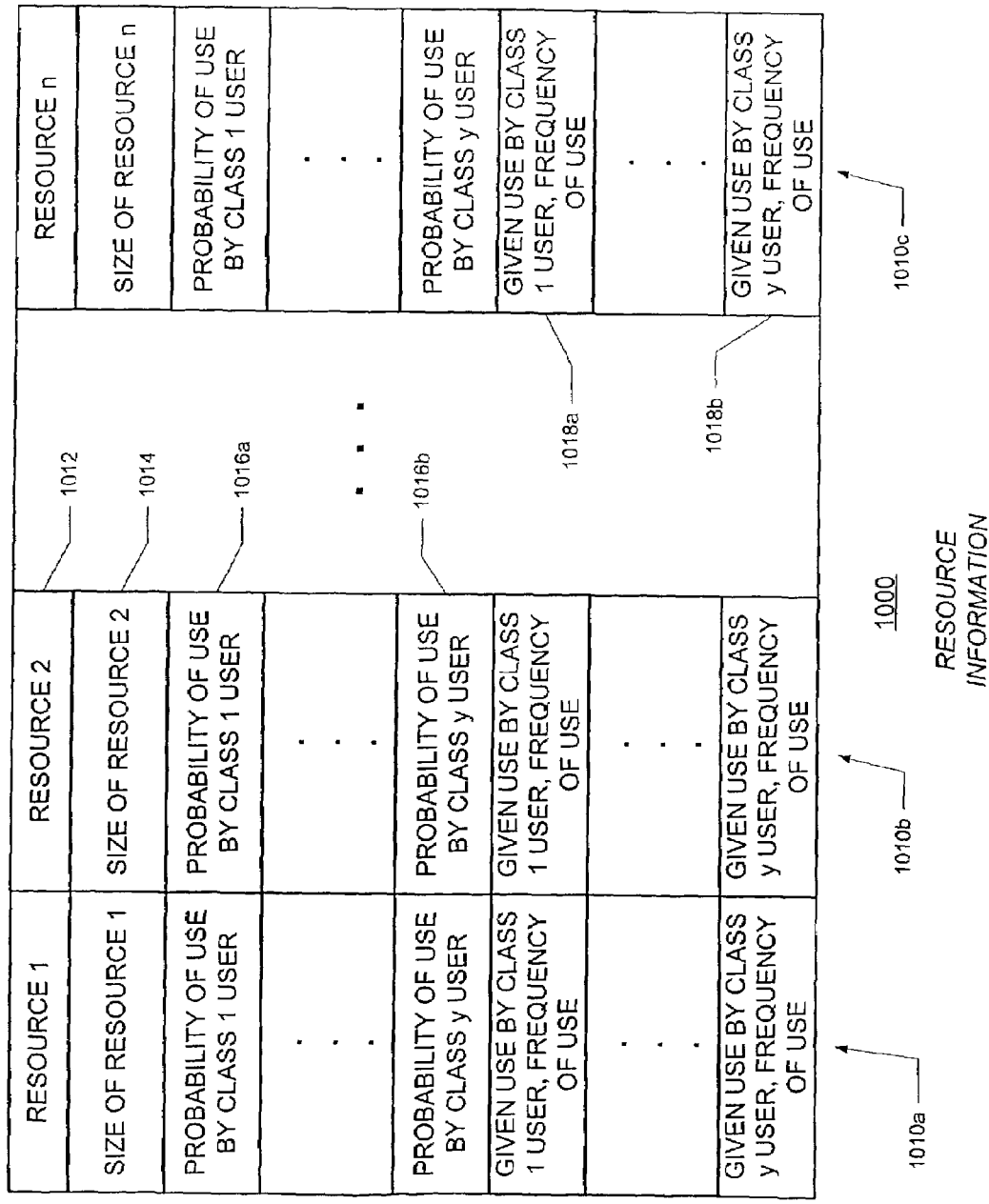
FIG. 10 depicts resource (such as software components, data, or content, for example) information which may be used by the present invention.

Referring to FIG. 10, the resource information 712 may include records 1010 for each of the software components (or more generally, resources) stored on the CD ROM 110'/710b. Each of the records 1010 may include a field 1012 for storing a resource identifier, a field 1014 for storing a size of the resource (in kilobytes for example), and fields 1016 for storing probabilities of use of the resource by each class of user type (which may be accessed and/or determined as described above). Recall that the probabilities of resource use by each user type class may be determined based on equation 4 or 5. Note that the fields 1018, for storing a frequency of use of the resource by the various user type classes, may be used by the distribution decision function of the present invention, though need not be used by the download decision function of the present invention. This information 1018 is not needed in the download aspect of the invention since it is only concerned with the probability that a resource will be requested more than once.

User type classes 714 may have a data structure 800 which includes a number y of fields 810 for storing user type classes.

Recall that the user type classes 714 may be assessed by an expert, or learned from empirical studies. Referring to FIG. 9, user type class probabilities 780 may have a data structure 900 which includes a number y of fields 910 for storing probabilities that a particular user "belongs to" each of the y user type classes. Recall that such probabilities may be inferred from various types of evidence using a Bayesian model, such as a Bayesian network built directly with expert assessments, or from a dataset collected from a sample of users and contexts.

Having described the environment for installing resources, such as software components for example, from a CD ROM(s), and having described accessing and/or determining and storing various information used by the component installation process 770, an exemplary method for effecting the component installation process 770 will now be described in § 4.2.2.3 below.

Figure 12:
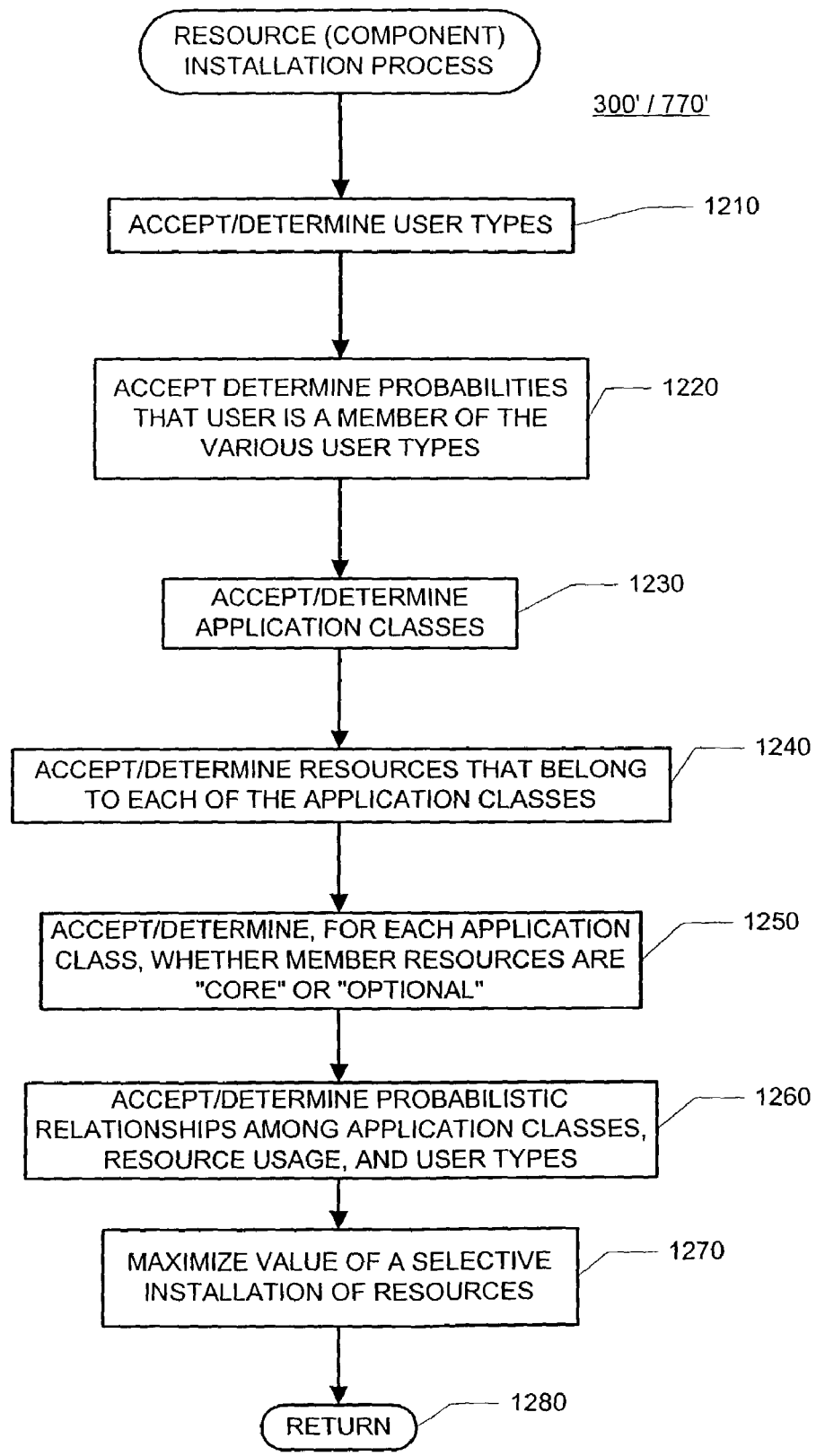
FIG. 12 is high level flow diagram of an exemplary method for downloading resources (such as installing software components, for example) in the first exemplary environment.

§ 4.2.2.3 Exemplary Method for Dwonloading Resources in the First Exemplary Environment FIG. 12 is a high level flow diagram of an exemplary method 300'/770' for performing the resource, such as a software component for example, installation process 770. First, as shown in act 1210, the user type classes 714 are accepted and/or determined. Recall that this information may be determined by an expert and this information may be accepted from the CD ROM(s) 110'/710b. (Recall, e.g., FIGS. 7 and 8.) Next, as shown in act 1220, the probabilities that a particular user belongs to various user type classes are accepted and/or determined. Recall that these probabilities may be determined using a Bayesian network. Then, as shown in acts 1230, 1240 and 1250, respectively, the application classes may be accepted and/or determined, the resources (such as software components for example) belonging to each of the application classes may be accepted and/or determined, and for each application, whether a member resource is a "core" resource or an "optional", resource may be accepted and/or determined. As discussed above, these acts may be performed ahead of time by an expert and may be stored as resource information 712 on the CD ROM(s) 110'/710b for example. (Recall FIG. 11.)

Next, as shown in act 1260, probabilistic relationships among applications, resources, and user type classes are accepted or determined. As discussed above, this information may include a probability that an application will be used at least once during a lifecycle of a product for each user type class, and the conditional probability that optional resources or components associated with the application would be used at least once, assuming that the application is used, for each user type class. To reiterate, each of these probabilities can be determined by a product of the probability that an application will be used and the conditional probability that an optional resource or component will be used, given that the application is used. (See, e.g., equation 4.) Recall that if it can be assumed that the probability that an optional resource or component is used given that an application is used, is independent of user class type, then the conditional probability that the optional resource or component will be used may be simplified. (See, e.g., equation 5.)

Finally, as shown in act 1270, a value of the resources to be installed is maximized. Regarding act 1270, recall that this problem can be thought of as a knapsack problem. That is, the set R can be thought of as a universe of resources (such as software components for example) the size s(r) can be thought of as a size (or footprint, in kilobytes for example) of the resource, and the size constraint B can be thought of as the size or available capacity of the non-volatile storage facility 120'/720. The value v(r) of each resource and the value sought to be optimized (or the value goal required) are described below. One exemplary approach to approximating the optimal solution employing a value-density method is described below. However, those skilled in the art understand that this is one of several techniniques available for identifying software components for caching that generate an approximate solution to the expected value maximization.

To make a decision about installing each resource in memory, a priority is computed for each component based on the ratio of the decrease in cost (or increase in value), or marginal value associated with installing each resource (such as a software component for example) to the cache and the change in the amount of memory resources required to cache the item, or marginal cost of, of installing each resource in terms of the size of the resource.

The incremental value of installing a resource (such as a software component for example) to the memory is the decrease in the expected cost of going back to the CD ROM(s) resource source 110'/710b during the life cycle of a product (that is, an application process 260'/760 that may use the resource). The change in expected cost with the addition of each resource is simply the probability of having to go back to the CD ROM resource source 110'/710b for the resource and the cost of going back.

The ratio of the incremental reduction of the expected cost $\Delta V(r_i)$ of going back to the CD ROM resource source 110'/710b for a resource (or component) $r_i$, and the change in storage requirement $\Delta M(r_i)$ required for each resource (or component) $r_i$, can be used to define a measure of the expected software storage value enhancement rate $\text{Rate}(r_i)$ for each resource (or component) $r_i$. That is, the enhancement rate can be expressed as:

$$\text{Rate}(r_i) = \Delta V(r_i)/\Delta M(r_i) \qquad (6)$$

Note that $\Delta V(r_i)$ can be expressed as:

$$-p(r_i \text{ used} > 1) \times \text{Cost of going back to resource source.} \qquad (7)$$

If the cost of not having a resource (or component) is the same for all $r_i$ resources (or components), the value of installing a resource $r_i$ may be considered to be just the probability that the resource will be used at least once. A value density (VD) or rate of value acquired with memory required for storing the resource $r_i$ may be expressed as:

$$VD(r_i) \equiv \text{Rate}(r_i) \equiv \frac{p(r_i \text{ used} \geq 1)}{\text{size}(r_i)} \qquad (8)$$

In this case, since the cost for finding and loading the CD ROM(s) and for running an installation program is much greater than the cost for copying a resource from a CD ROM to a non-volatile storage facility, it is assumed that the cost for later installing a needed resource, or software component, is the same for all components, regardless of their sizes.

To reiterate, a greedy value-density algorithm can be used to maximize the expected value (or minimize the expected future access cost) of an information store. Information about the marginal costs and benefits of installing a resource (such as software components for example), as described above, is used in the "greedy" approximation algorithm described below. The greedy approximation algorithm for solving this knapsack-type problem includes four (4) basic steps. First, the set R of resources $r_i$ is ordered by "value enhancement rate" or "value density", that is, such that:

$$\frac{v(r_1)}{s(r_1)} \geq \frac{v(r_2)}{s(r_2)} \geq K \geq \frac{v(r_n)}{s(r_n)} \qquad (9)$$

The "value density" may be determined as shown in equation (8) or the "value enhancement rate" may be determined as shown in equations (6) and (7). Second, the resources are added to the knapsack, in the order of their value density until the knapsack is filled. That is, such that:

$$\Sigma s(r) < B \qquad (1)$$

where B is the size or available capacity of the non-volatile storage facility 120'/720. Third, an alternative solution is defined as simply installing the most valuable resource, without regard to its size, to the non-volatile storage facility (or knapsack) 120'/720, if doing so would not overfill the non-volatile storage facility 120'/720. Fourth, the overall value of the two solutions is compared and the solution with the maximum value is chosen.

Thus, in this example, the resources (or components) $r_i$ are ordered by their storage value enhancement rate $\text{Rate}(r_i)$. These resource (or components) are stored and their sizes $S(r_i)$ are summed until reaching the allocation limit. The expected cost of the download (installation) is compared with the policy of installing only the software component with the highest marginal value ($p(r_i \text{ used} > 1)$). If the policy of these two with the maximum reduction in the expected cost is chosen, where:

$$\text{Expected Cost Reduction} = \sum_j p(r_j \text{ is used} \geq 1) \times \qquad (10)$$

$$\text{cost of going back to resource source for } j$$

where j is an index for summing, overall non-downloaded components, the probability of needing a non-downloaded component at least once, and where the cost of going back to the resource source is assumed to be the same for all of the components, regardless of their size, then the expected value of the solution will be within a factor of two of the minimal cost policy.

This approximation algorithm may be enhanced by using a related knapsack approximation procedure that employs limited search among subsets of downloaded components to reduce the expected cost even closer to the optimal value (See, e.g., the article: Sahni, S., "Approximate Algorithms for the 0/1 Knapsack Problem," *Assoc. Computing Machinery*, Vol. 22, pp. 115-124 (1975)). Specifically, the solution from this knapsack approximation procedure is within 1+1/k of the optimal value and is achieved by searching through all subsets of k or fewer items as the initial values of the greedy algorithm described above. Such subset searching can occur in given available time for additional optimization.

Note that the probabilities and expected costs of not storing items could both change over time (e.g., with changing evidence, capturing such aspects about a user or context as usage patterns) and that a reassessment of these parameters over time (e.g., with the consideration of new observations or data) can change ideal caching decisions, leading to a re-optimization.

§ 4.2.3 Second Exemplary Environment: Downloading Resources from a "Docking Station" to an Un-Tethered Device Recall that software components, and data such as addresses, telephone numbers, schedules, and to-do lists, for example, may be downloaded onto an un-tethered device, such as a palm computer, a personal digital assistant, a cordless telephone, or another information appliance. In such cases, the software components and/or data are transferred from a source having less limited storage (also referred to as a "docking station"), such as a desktop personal computer for example. Such un-tethered computing devices and information appliances typically have relatively small amounts of storage. The present invention may be used to optimize the resources downloaded to those limited storage facilities.

§ 4.2.3.1 Environment

Figure 13:
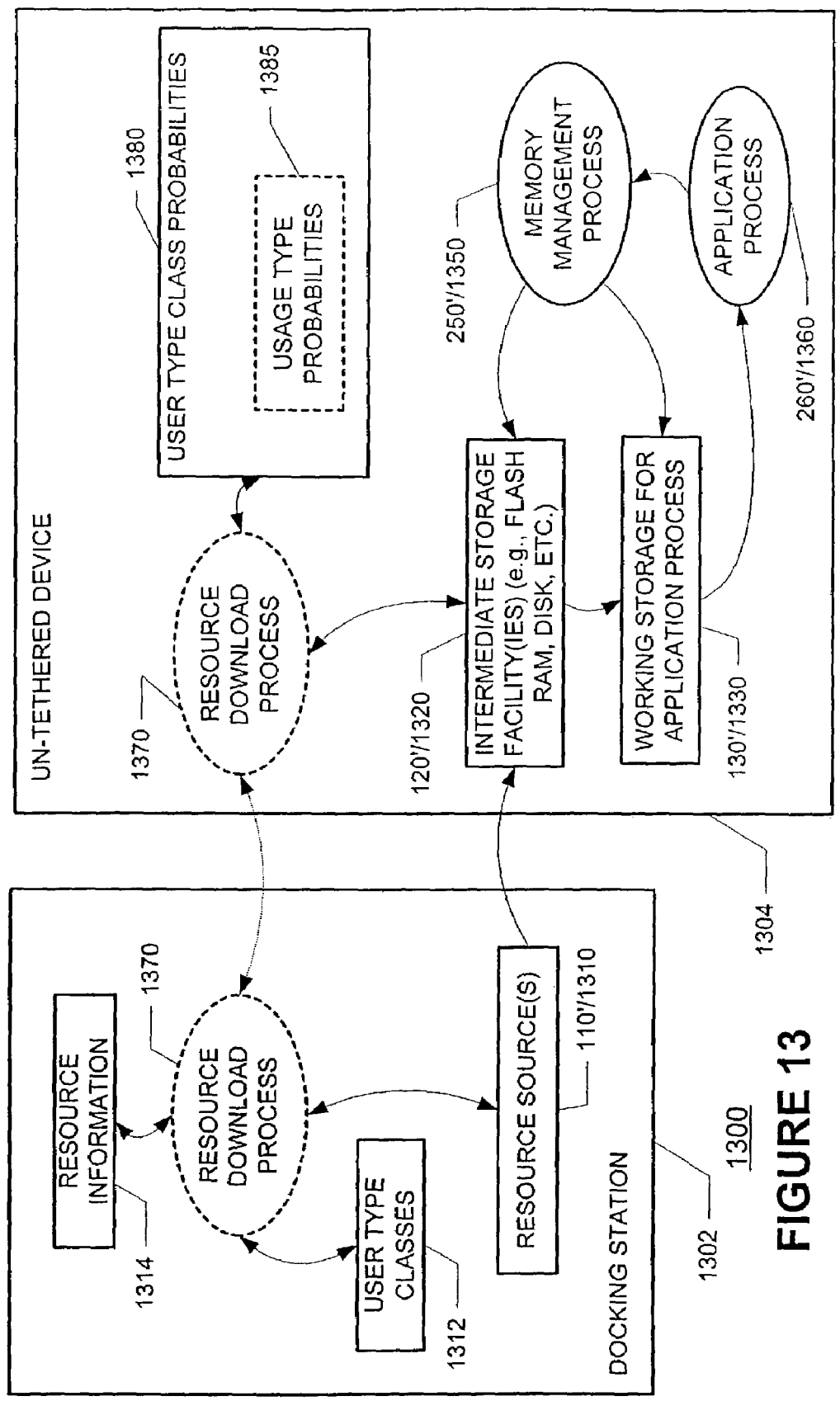
FIG. 13 is a high level block diagram which illustrates the operation of the present invention in a second exemplary environment.

FIG. 13 is an exemplary environment 1300 in which resources are downloaded from a resource source(s), such as a magnetic disk drive for example, 110'/1310 of a docking station, such as a personal computer for example, 1302 to an intermediate storage facility(ies) 120'/1320 of an un-tethered computing appliance 1304. The downloading may be performed by a resource download process 1370 in accordance with the present invention. As shown in FIG. 13, the resource download process 1370 may be carried out on the docking station 1302 and/or the un-tethered device 1304.

It is expected that an application process 260'/1360 will use one or more of the downloaded resources. A memory management process 250'/1350 will manage the retrieval of resources, requested by the application process 260'/1360. Thus, referring to both FIGS. 1 and 13, the resource source(s) 110'/1310 of the docking station 1302 can be thought of as a resource source 110, the intermediate storage facility(ies) 120'/1320 can be thought of as an intermediate storage facility(ies) 120, and the working storage 130'/1330 for the application processes 260'/1360, such as RAM for example, 130'/1330 can be thought of as working storage 130.

The resource download process 1370 will perform at least some aspects, namely a download determination function, of the present invention. That is, the resource download process 1370 determines which software components or resources of the resource source(s) 110'/1310 to install onto the intermediate storage facility(ies) 120'/1320.

In this exemplary environment, it will be assumed that once resources are downloaded and the un-tethered device 1304 is removed from the docking station 1302, there will be a high cost for re-docking and downloading additional resources. For example, if a user downloads resources to their un-tethered device 1304 and then leaves on a business trip, it will be difficult, if not impossible, to download additional resources during the course of that trip. Thus, as will be described below, the resource download process 1370 will be concerned with the probability that a resource will be used at least once before the next time the un-tethered device 1304 is again docked.

As shown in FIG. 13, the resource download process may consider resource information 1312, which may reside at the docking station 1302 for example, user type classes 1314, which may also reside at the docking station 1302 for example, and probabilities that a user belongs to the various user type classes 1380, which may reside on a resident memory of the un-tethered device 1304 for example. As will be explained below, the user type classes may differ from those discussed above with reference to the first exemplary environment, and the user type class probabilities may be determined in a different way than those discussed above with reference to the first exemplary environment. Exemplary data structures for storing the resource information 1312, the user type classes 1314, and the user type class probabilities 1380 (which may include usage type classes 1385) will now be described in § 4.2.3.2 with reference to FIGS. 8, 9, 10, and 11.

§ 4.2.3.2 Data Structures and Data Derivation

The resource download process 1370 may consider a number of factors which may be thought of as resource information 1312, user type classes 1314, and user type class probabilities 1380/1385. Exemplary ways to access and/or determine this data are described in § 4.2.3.2.1. Exemplary data structures for storing this data are described in § 4.2.3.2.2.

§ 4.2.3.2.1 Accessing and/or Determining Data

Like the software component installation environment, in this environment 1300, it is assumed that the cost of docking the un-tethered device to a docking station for downloading resources is very high, since the very attractiveness of un-tethered devices is their portability and independence. Accordingly, one of the goals of the resource download process 1370 is to minimize the probability that a user will have to incur the expense of not having a resource available when it is needed by an application process 260'/1360. Although this problem can be solved for a specific case in which it is assumed that all users are the same, in this example, it will be assumed that different types of users will have different probabilities of using a resource. Thus, a set of mutually exclusive and exhaustive user type classes is sought. Again, this set of user type classes can be estimated by experts or may be learned from a learning machine such as a cluster analyzer for example. In the following example, since various classes of users may use an un-tethered computing device differently in different situations, such various uses are considered as a part of the user type classes. For example, user type classes may be "salesman", "child", "business man", and "engineer". Each of these user type classes may be further divided based on the intended upcoming use of the un-tethered computing appliance 1304. For example, a "child" user type class may be divided into "child/schoolwork" and "child/video games". Thus, a child going to school will be more likely to need calculation software, while a child going to his friends house will more likely need video game software. Similarly, an "engineer" user type class may be divided into "engineer/work", "engineer/business trip", "engineer/commute" and "engineer/vacation". Thus, an engineer commuting to work will more likely want to download daily news resources, an engineer going to work will more likely want to download engineering applications, and an engineer on a business trip will more likely want important telephone numbers and trip related information.

The resources are also classified, which may be done based on an expert assessment for example. In this example, the resources may be classified as "news", "business", "personal", "education", "entertainment", etc.

Thus, in this case, for each of the user type classes, a probability that the user will use a resource at least once before the next expected docking of the un-tethered computing appliance is assessed. Given uncertainty over the user's user type class, this probability may be expressed as:

$$p(\text{resource used} \geq 1 \mid \text{time offline, recent usage pattern}) = \sum_{i \in \text{all user type classes}} p(\text{resource used} \geq 1 \mid \text{user type class}_i, \text{timeoffline, recentusagepattern}) \times p(\text{user type class}_i) \quad (11)$$

Once again, probabilities that a user belongs to the particular user type classes (p(user type class$_i$)) is sought. To reiterate, on possible approach is to user a Bayesian networks which may consider relevant evidence. Since, in this example, the user type classes consider intended upcoming use, the Bayesian network may consider the answer to the question "What do you intend to do before re-docking?". The Bayesian network specifies that the class of user type influences the probability distributions over the evidence. At run time, one or more pieces of evidence are considered and the Bayesian inference system generates a set of probabilities of the user belonging to each of a number of user type classes (which may be further divided into usage classes). For tethering decisions, recent patterns of access of components and content may also be considered in computing the probability that a component will be used for the time the device will likely. Such models probability may be used as a function of recency of components that have been executed, created, modified, and allow for the decay of the likelihood given the quantity of time that has passed since the component or content was last accessed.

In an alternative formulation, the cost of not having a component for some amount of time until docking, conditioned on the context and user class is considered. In this alternative, this cost is to be minimized. The likelihood that a resource will be needed given the time expected for the user to be disconnected from the information, $$p(r_j \text{ needed} | \text{time offline, recent usage pattern}) = \sum_{ie \text{ all user type classes}} p(r_j \text{ needed} | \text{user type class}_i, \text{timeoffline, recentusagepattern}) \times p(\text{user type class}_i) \quad (11)$$

is considered. The expected marginal value of caching the item is, $$\Delta V(r_j) = p(r_j \text{ needed} | \text{time offline, recent usage pattern}) \text{Cost}(r_j \text{ needed}, r_j \text{ absent, time offline})$$

where

Cost($r_j$ needed, $r_j$ absent, time offline)

is the cost associated with needing a resource (or component) when it is absent for the time the user is offline.

Note that the time that a user will be untethered is not known with certainty. Such a model of cost can be extended to include a probability distribution over time offline. Such a probability distribution can be conditioned on user type class, recent usage pattern, and other contextual information, such as information acquired from a calendar (e.g., "User's calendar reports that user will be shortly be leaving to travel to Hong Kong from Seattle.")

Considering a probability distribution over time offline, the expected marginal value of storing a component that has not yet been stored is, $$\Delta V(r_i) = \int_t p(\text{time offline } t | \text{recent usage pattern, context})$$

$$p(r_i \text{ needed} | \text{time offline } t, \text{recent usage pattern, context})$$

$$\text{Cost}(r_i \text{ needed}, r_i \text{ absent, time offline}) dt$$

This equation can be rewritten to consider the probability distribution over the user class.

§ 4.2.3.2.2 Data Structures

Like discussed in § 4.2.2.2.2 above, with reference to the first exemplary environment, the data structures used in the second exemplary environment may include a list of user type classes 800, a list of user type class probabilities 900, and records 1010, each of the records including a field 1012 for identifying a resource, a field 1014 for storing the size of a resource, and fields 1016 for storing probabilities that the various user type classes will use the resource at least once before re-docking.

Figure 14:
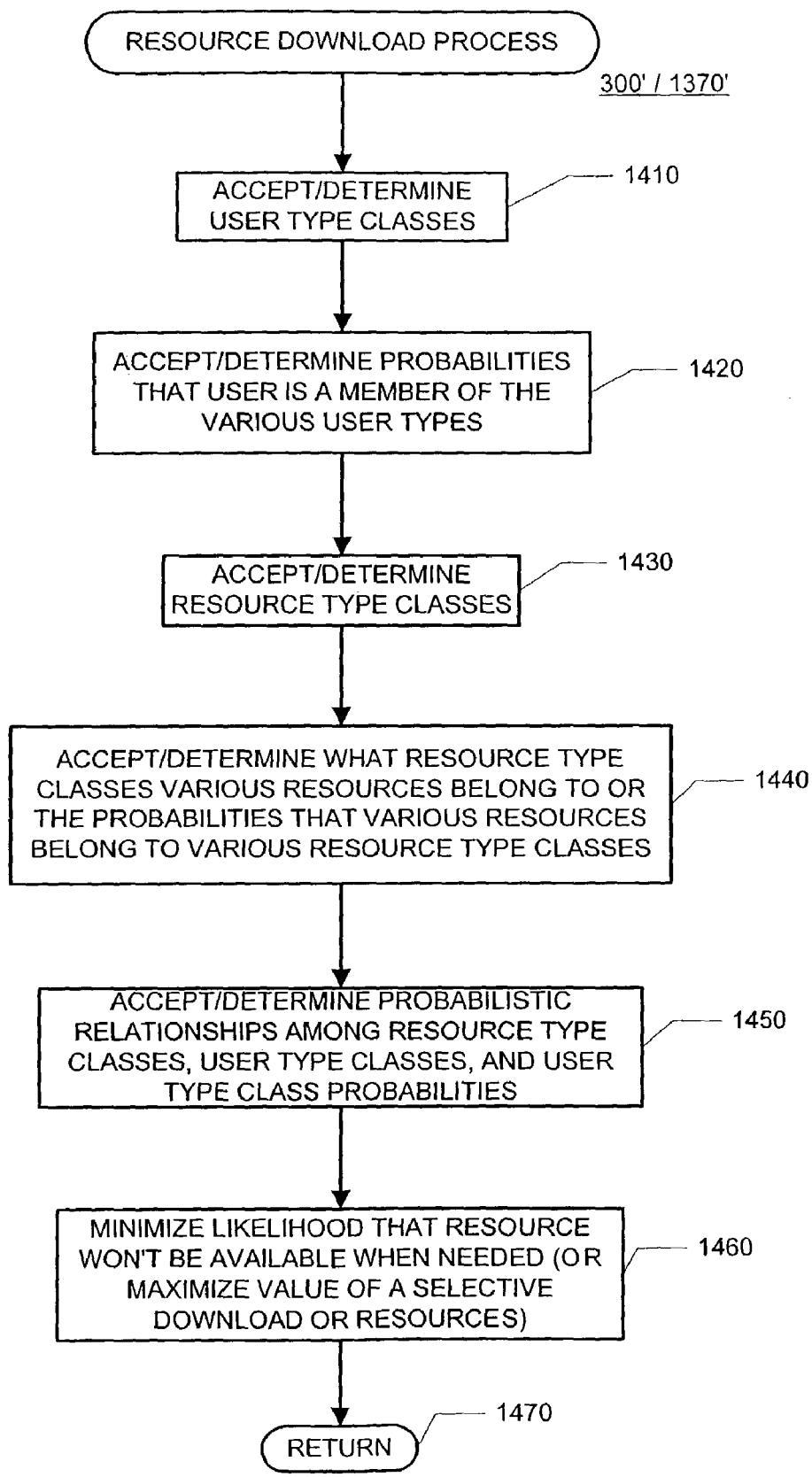
FIG. 14 is high level flow diagram of an exemplary method for downloading resources in the second exemplary environment.

§ 4.2.3.3 Exemplary Method for Downloading Resources in the Second Exemplary Environment FIG. 14 is a high level flow diagram of an exemplary method 300'/1370'for performing the resource download process 1370. First, as shown in act 1410, the user type classes 1312 are accepted and/or determined. Recall that this information may be determined by an expert. (See, e.g. FIGS. 8 and 13.) Next, as shown in act 1420, the probabilities that a particular user belongs to various user type classes are accepted and/or determined. Recall that these probabilities may be determined using a Bayesian network. Then, as shown in act 1430 the resource type classes 1314 may be accepted and/or determined. Next, as shown in act 1440, the resources belonging to each of the resource type classes, or alternatively, the probabilities that the various resources belong to the various resource type classes may be accepted and/or determined. These acts may be performed ahead of time by an expert and may be stored as resource information 1314 for example. Next, as shown in act 1450, probabilistic relationships among the resource type classes, the resources, the user type classes and the user are accepted and/or determined. As discussed above, this information may include a probability that a resource will be used at least once before the next expected docking, for each user type class, the probabilities that a user belongs to the various user type classes, and the probabilities that various resources belong to the various resource type classes. Finally, as shown in act 1460, a value of the resources to be downloaded is maximized, or, to put it another way, the likelihood that a resource requested by the application process 260/1360 won't be available is minimized. Regarding act 1460, recall that this problem can be thought of as a knapsack problem. That is, the set R can be thought of as a universe of resources, the size s(r) can be thought of as a size (or footprint, in kilobytes for example) of the resource, and the size constraint B can be thought of as the size or available capacity of the intermediate storage facility (ies) 120'/1320. The value v(r) of each resource and the value sought to be optimized (or the value goal required) are described below.

As with the first environment, the marginal cost, in terms of memory usage, of downloading each resource is the size of the resource. The incremental value of downloading a resource to the intermediate storage facility(ies) 120'/1320 of the un-tethered device 1304 is the decrease in the expected cost of needing to go back to the docking station before the next expected or scheduled re-docking. The change in expected cost with the addition of each resource is simply the product of the probability that the user will need a component and not have it, and the cost of not having the document until the next re-docking. If it is assumed that a user will re-dock if they need something, the cost may be expressed as the product of the probability of needing to re-dock on the cost of re-docking prematurely.

The ratio of the incremental reduction of the expected cost $\Delta V(r_i)$ of prematurely re-docking to download a resource (or component) $r_i$, and the change in storage requirement $\Delta M(r_i)$ required for each resource (or component) $r_i$, can be used to define a measure of the expected resource storage value enhancement rate $R(r_i$ for each resource (or component) $r_i$. Recall that the enhancement rate can be expressed as:

$$\text{Rate}(r_i) = \Delta V(r_i)/\Delta M(r_i) \tag{6}$$

Note that $\Delta M(r_i)$ can be expressed as:

$$-p(r_i \text{ used} > 1 \text{ before re-docking}) \times \text{Cost of pre-maturely re-docking to download resource from the source.} \tag{7'}$$

or can be expressed as:

$$p(r_i \text{ needed} > 1 \text{ time before re-docking}) \times \text{Cost of not having the resource (or component) for the period of time until re-docking.}$$

In deciding about which resources (or components) to download, resources (or components) are ordered by the value density, determined by ratio of the change in value and the memory size of the downloaded resource (component). Thus a value density may be expressed as:

$$VD(r_i) \equiv \frac{p(r_i \text{ used} \geq = 1) \times \text{cost of premature redocking}}{s(r_i)} \tag{8}$$

In this case, since the cost of prematurely re-docking the un-tethered device is much greater than the cost of copying a resource to the storage facility(ies) of the un-tethered device, it is assumed that the cost for later downloading a needed resource before a next scheduled docking is the same for all resources, regardless of their sizes.

To reiterate, a greedy algorithm can be used to minimize the expected cost of a resource store. Information about the marginal costs and benefits of downloading a resource, as described above, is used in the "greedy" approximation algorithm described below. The greedy approximation algorithm for solving this knapsack-type problem includes four (4) basic steps. First, the set R of resources $r_i$ is ordered by "value enhancement rate" or "value density", that is, such that:

$$\frac{v(r_1)}{s(r_1)} \geq \frac{v(r_2)}{s(r_2)} \geq K \geq \frac{v(r_n)}{s(r_n)} \tag{9}$$

The "value density" may be determined as shown in equation (8) or the "value enhancement rate" may be determined as shown in equations (6) and (7). Second, the resources are added to the knapsack, in the order of their value density, until the knapsack is filled. That is, such that:

$$\Sigma s(r) \leq B \tag{1}$$

Where B is the size of available capacity of the intermediate storage facility(ies). Third, an alternative solution is defined as simply installing the most valuable resource to the intermediate storage facility(ies). Fourth, the overall value of the two solutions is compared and the solution with the maximum value is chosen.

Thus, in this example, the resources are ordered by their storage value enhancement rate $\text{Rate}(r_i)$ or value density $VD(r_i)$. These resource (or components) are stored and their sizes $s(r_i)$ are summed until reaching the allocation limit. The expected cost of this download is compared with the policy of downloading only the resource with the highest marginal value ($p(r_i \text{ used} \geq 1)$). If the policy of these two with the maximum reduction in the expected cost is chosen, where:

$$\text{Expected Cost Reduction} = \sum_j p(r_j \text{ used} \geq 1) \times \text{cost of premature redocking} \tag{12}$$

where j is an index for summing, over all non-downloaded resources, the probability of needing non-downloaded resource at least once, and where the cost of going back to the resource source is assumed to be the same for all of the resources, regardless of their size, then the expected value of the solution will be within a factor of two of the minimal cost policy.

This approximation algorithm may be enhanced by using a related knapsack approximation procedure that employs limited search among subsets of downloaded resources to reduce the expected cost even closer to the optimal value (See, e.g., the article: Sahni, S., "Approximate Algorithms for the 0/1 Knapsack Problem," *Assoc. Computing Machinery*, Vol. 22, pp. 115-124 (1975)). Specifically, the solution from this knapsack approximation procedure is within 1+1/k of the optimal value and is achieved by searching through all subsets of k or fewer items as the initial values of the greedy algorithm described above. Such subset searching can occur in given available time for additional optimization.

In view of the foregoing, beyond downloading resources for installation, the download decision function of the present invention can be applied to downloading files for mobile computing or information applications. That is, the download decision function of the present invention can be used to determine the best content and resources (or components) to download from a tethered computer or server to a un-tethered device, such as a handheld or laptop device.

§ 4.2.4 Third Exemplary Environment: Distributing Software Components

Recall that some computers users will have more than one disk drive, each of which may have different latencies and different capacities. Below, an environment in which resources, such as software components for example, are optimally installed on the various intermediate storage facilities is described, with reference to FIG. 15, in § 4.2.4.1. Exemplary data structures for installing the resources, such as software components, for example, are described below, with reference to FIGS. 8, 9, 10 and 16, in § 4.2.4.2. Finally, exemplary methods for performing the distribution decision function of the present invention in this environment is described, with reference to FIG. 17, in § 4.2.4.3 below.

§ 4.2.4.1 Environment

Figure 15:
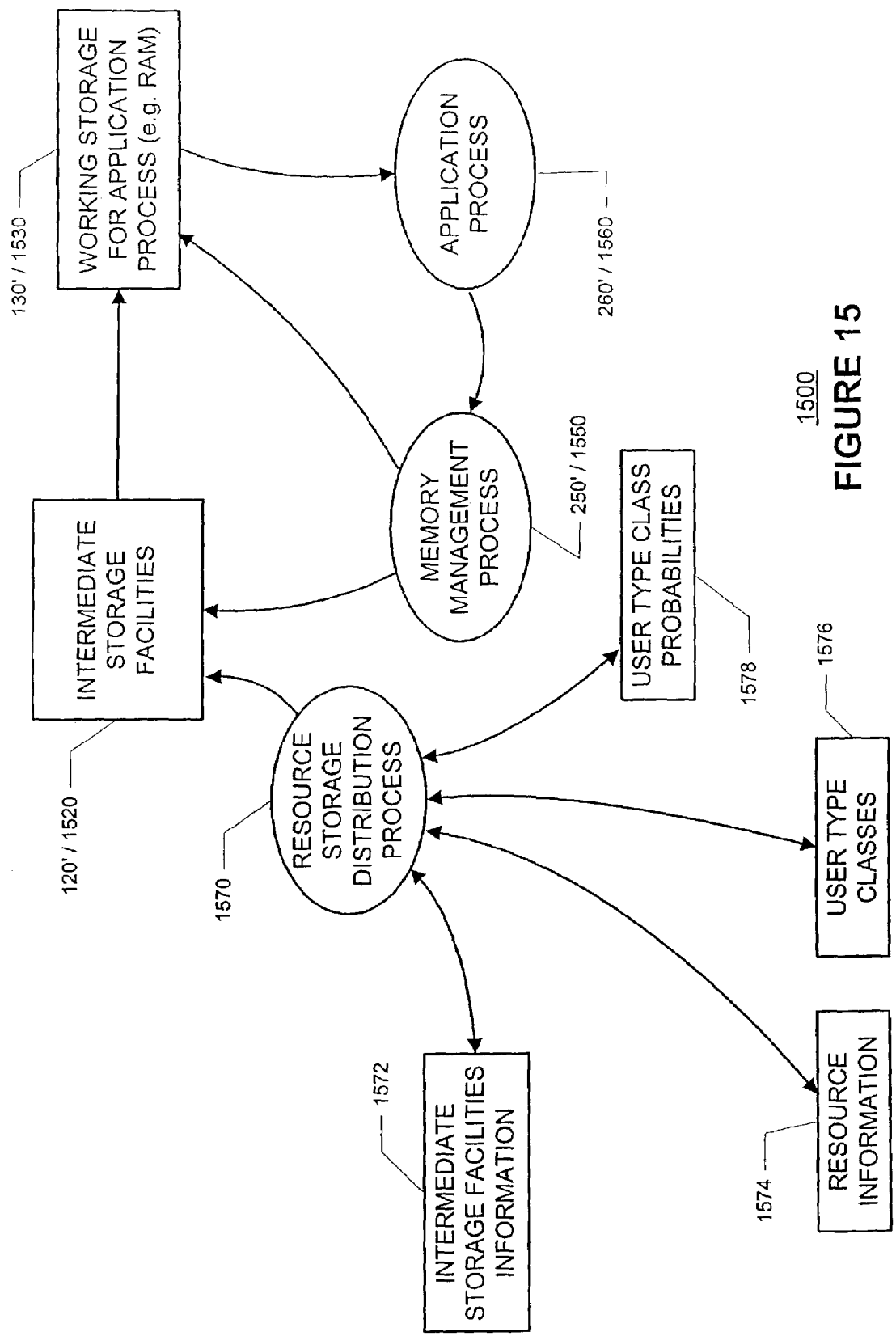
FIG. 15 is a high level block diagram which illustrates the operation of the present invention in a third exemplary environment.

FIG. 15 is a high level diagram which illustrates an environment 1500 in which the present invention can be used to determine how to distribute resources, such as software components for example, across a number of intermediate storage devices 120'/1520. It is expected that an application process 260'/1560 will use one or more of the installed resources. A memory management process 250'/1550 will manage the retrieval of the resources requested by the application process 260'/1560.

The resource storage distribution process 1570 will perform at least some aspects, namely a distribution determination function, of the present invention. That is, for a set of resources, the resource storage distribution function 1570 determines which of the intermediate storage devices is to store each of the resources. The various intermediate storage devices may have various sizes and various time delays (such as the time between the request of a resource by the application process 260'/1560 to the receipt of the resource by the application process 260'/1560 for example).

As shown in FIG. 15, the resource storage distribution process 1570 may consider the intermediate storage facilities information 1572, resource information 1574, user type classes 1576, and user type class probabilities 1578. Exemplary data structures for the intermediate storage devices information 1572, resource information 1574, user categories 1576, and user category probabilities 1578 will now be described in § 4.2.4.2 with reference to FIGS. 8, 9, 10, and 16.

§ 4.2.4.2 Data Structures and Data Derivation

As just stated, the resource storage distribution process 1570 may consider a number of factors which may be thought of as intermediate storage facility(ies) information 1572, resource information 1574, user type classes 1576, and user type class probabilities 1578. Exemplary ways to access and/or determine this data are described in § 4.2.4.2.1. Exemplary data structures for storing this data are described in § 4.2.4.2.2.

4.2.4.2.1 Accessing and/or Determining Data

One of the goals of the resource storage distribution process 1570 is to minimize the "expected time delay" between requesting and receiving resources, such as software components for example. Here, the term "expected time delay" is a function of the number of times a resource is requested or invoked and the time delay experienced each time. Although this problem can be solved for a specific case in which it is assumed that all users are the same, in this example, it will be assumed that different types of users will use a resource, such as a software component for example, with different frequencies. Thus, as was the case with the components installation application of the present invention used in the first exemplary environment, a set of mutually exclusive and exhaustive classes of user type is sought. In this example, it will be assumed that the user type classes may include "heavy-duty Internet developer", "database developer", "application developer", "multimedia developer", "intranet—light database developer", "intranet—heavy database developer", "Java tools only developer", and "wants everything".

As was the case with the components installation application of the present invention used in the first exemplary environment, a set of application classes may also be sought, and will typically be determined based on expert assessment. Recall that for each of the application classes, the distinct resources, such as software components for example, comprising the application class are enumerated and may be marked as "core" (or essential) resources or "optional" resources. Again, this enumeration and marking may be performed based on an expert assessment.

Thus, the information contained in the spreadsheet 1100 of FIG. 11 may also be used by the resource storage distribution process 1570. To reiterate, a first column 1110 of the spreadsheet 1100 lists applications 1112 and the basic or core 1114 and optional 1117 resources or components of each of the applications. A second column 1120 includes, for each of the applications 1112, a size 1114 of its core components 1114 and sizes 1118 of its optional components 1117. Further columns 1130 are provided for each of the user type classes 1132.

Recall that in the application of installing components in the first exemplary environment, that for each of the user type classes 1132, a probability 1134 that the user will use the core components of the application was assessed. However, the resource storage distribution process 1570 will want to consider the probability distribution over the number of times the resource is used. Thus, in this case, given use of a resource by a user of a user type class, the frequency of use of the resource is accessed. This frequency of use may be derived by expert assessment and/or from actual usage logs.

Given the set of user class types, the set of applications, and frequencies at which users of a particular class type will use a particular resource or software component, probabilities that a user belongs to the particular user type classes (P(User Type $Class_i$)) are sought. As was the case with the components installation application of the present invention used in the first exemplary environment, a Bayesian inference system may be used to generate a set of probabilities of the user belonging to each of a number of user type classes.

4.2.4.2.2 Data Structures

As discussed above, the resource storage distribution process may use intermediate storage facilities information 1572. Referring to FIG. 16, this information may have a data structure 1600 which includes records 1610 corresponding to each of the intermediate storage facilities. Each of the records may include a field 1612 for storing an identification of the intermediate storage facility, such as a logical drive letter for example, a field 1614 for storing a time delay of the intermediate storage facility, and a field 1616 for storing a size or available capacity of the intermediate storage facility. Note that the intermediate storage facilities may include local storage devices, and/or remote storage devices. Thus, the time delay of an intermediate storage may be a request-to-receive time which may be a function of a read time, a seek time, a data channel, and/or network latency time, etc.

The resource information 1574 may include records 1010 for each of the resources to be distributively stored. Each of the records may include a field 1012 for storing a resource identifier, a field 1014 for storing a size of the resource (in kilobytes for example), and fields 1018 for storing frequencies of use by each user type class (which may be accessed and/or determined as described above).

As was the case with the components installation application of the present invention used in the first exemplary environment, the user type classes 1576 may have a data structure 800 which includes a number y of fields 810 for storing user type classes. Recall that the user type classes 1576 may be assessed by an expert. Referring to FIG. 9, user type class probabilities 1578 may have a data structure 900 which includes a number y of fields 910 for storing probabilities that a particular user "belongs to" each of the y user type classes. Recall that such probabilities may be inferred from various types of evidence using a Bayesian network.

Having described the environment for distributively storing resources, such as software components for example, and having described accessing and/or determining and storing various information used by the resource storage distribution process 1570, an exemplary method for effecting the resource storage distribution process 1570 will now be described in § 4.2.4.3 below.

Figure 17:
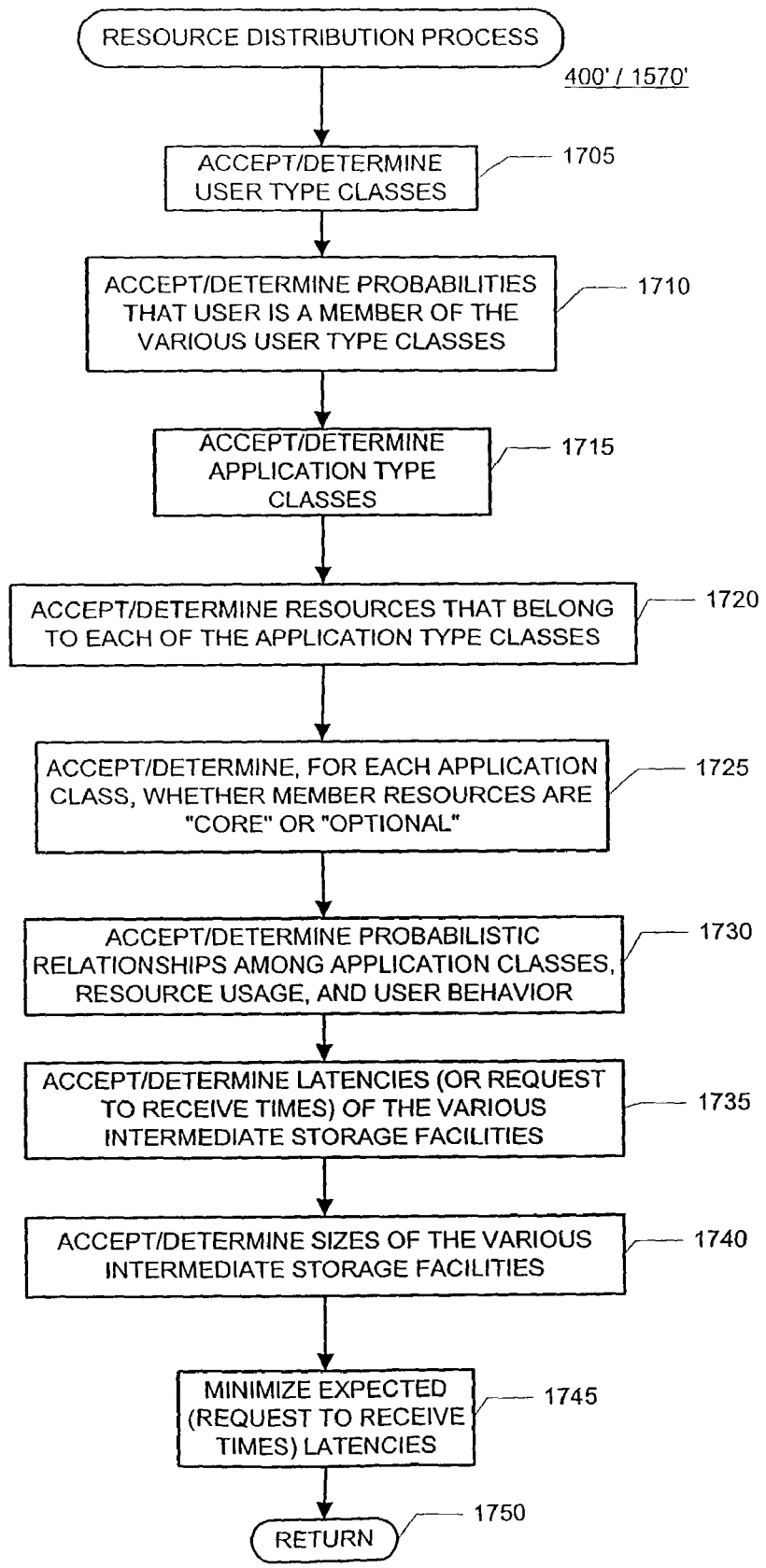
FIG. 17 is a high level flow diagram of an exemplary method for distributing resources among intermediate storage facilities in the third environment.

§ 4.2.4.3 Exemplary Method for Distributing Resources in the Third Exemplary Environment FIG. 17 is a high level flow diagram of an exemplary method 400'/1570' for performing the resource, such as a software component for example, storage distribution process 1570. First, as shown in act 1705, the user type classes 1576 are accepted and/or determined. Recall that this information may be determined by an expert. Next, as shown in act 1710, the probabilities that a particular user belongs to various user type classes are accepted and/or determined. Recall that these probabilities may be determined using a Bayesian network. Then, as shown in acts 1715, 1720 and 1725, respectively, the application classes may be accepted and/or determined, the resources (such as software components for example) belonging to each of the application classes may be accepted and/or determined, and for each application, whether a member resource is a "core" resource or an "optional" resource may be accepted and/or determined. These acts may be performed ahead of time by an expert and may be stored as resource information 1574. (See, e.g., FIG. 11.) Next, as shown in act 1730, probabilistic relationships among application classes and user type classes are accepted and/or determined. As discussed above, this information may include a frequency of use of a resource for each user type class. Next, in acts 1735 and 1740, respectively, the time delays and sizes, or available capacities, of the various intermediate storage facilities 120'/1520 are accepted and/or determined.

Finally, as shown in act 1745, a total of expected request-to-receive times for the resources is minimized. Recall that "expected time delay" may be a function of the number of times a resource is requested and the time delay experienced each time. This problem can be thought of as a multi-tiered knapsack problem. That is, the set U can be thought of as a universe of resources (such as software components for example), the size $s(r)$ can be thought of as a size (or footprint, in kilobytes for example) of the resource, and size constraints $B_{sfi}$ can be thought of as the size or available capacity of an intermediate storage facility, as indexed by a storage facility index ("sfi"). The value $v(r)$ of each resource and the value sought to be optimized (or the value goal required) are described below. That is, a knapsack solution for mounting software components on the fastest (lowest time delay) storage facility and then next most responsive, etc., until only the slowest (highest time delay) storage facility has space left for components, may be determined as follows.

Consider, for example, the availability of two (2) storage facilities: (1) relatively fast storage facility having relatively low time delays (which may be local and may be relatively expensive and small), and (2) a relatively slow storage facility having relatively high time delays (which may be remote and may be relatively inexpensive and large). All of the resources, such as software components for example, may be initially assigned to the high latency storage facility. As was the case with the download determination of the present invention, the rate of diminishment of cost with the allocation of fast storage space to components, $\text{Rate}(r_i) = \Delta V(r_i)/\Delta M(r_i)$ is considered. However, in contrast to downloading resources, instead of seeking to minimize the probability of going back to a resource source, and thus the expected cost, now $C_i$—the expected time delay between requesting and receiving the stored resources, such as software components—is minimized. To reiterate, the expected cost associated with time delay is a function of the number of times a resource is requested over some period and the time delay experienced each time.

The marginal gain $\Delta C(r_i)$, for moving a resource $r_i$ from the slower storage facility S to the faster storage facility F is:

$$\Delta C(r_i) = \text{(Mean number of times resource } r_i \text{ is invoked/unit of time)} \times \text{(time delay(storage facility}_S\text{)} - \text{time delay(storage facility}_F\text{))} \quad (13)$$

As discussed above, the mean number of times that different resources will be requested as a function of a situation and/or of a user class can be assessed ahead of time by experts, or from data logs. This information can be updated with information gathered by monitoring a user's usage patterns. Time delays can be estimated for resources depending on their size and class (executable, content, etc.), and normalized for a specific system and stored automatically through a process of testing the speed of access and execution (depending on the component type) of standard test components on the different available stores.

Alternatively, a value of moving a component $C_i$ from a slower storage facility to a faster storage facility may be proportional to the frequency of use of the component $r_i$ and a time delay differential. Thus, the value density of moving a component $r_i$ from a slower storage facility S to a faster storage facility F may be expressed as:

$$VD \equiv \frac{\text{frequency of use of } r_i \times (\text{time } delay_S(\text{Size}(r_i)) - \text{time } delay_F(\text{Size}(r_i)))}{s(r_i)} \quad (14)$$

If the delays grow linearly with size of components, VD can be expressed in terms of the delay per byte, as:

$$VD \equiv \frac{\text{frequency of use of } r_i \times (\text{time } delay_S(\text{byte}) - \text{time } delay_F(\text{byte})) \times s(r_i)}{s(r_i)} \quad (15)$$

Since the size of the resource (or component) $r_i$ is found in both the numerator and denominator, the value density may be simply expressed as:

$$VD = \text{frequency of use of } r_i \times (\text{time } delay_S/\text{byte} - \text{time } delay_F/\text{byte}) \quad (15)$$

As was the case with the download determination aspect of the present invention, to avoid a complex exponential search, a greedy algorithm may be used to minimize the expected latency of distributively stored resource by distributing, selectively, resources onto various storage devices. The approximation is based on ordering the resources by the expected latency reduction rate $\text{Rate}(r_i)$ or by the value density VD. The ordered resources are stored to the lower-time delay storage facility until reaching the limit of the lower time delay storage facility. The resulting value, that is the expected time delay, of the lower time delay storage device is compared with the policy of shifting over only the resource with the highest marginal value (frequency of use of $r_i$). Using this greedy approximation algorithm, the expected cost of the solution will be within a factor of two of the minimum solution. Like before, this approximation may be enhanced by employing a related knapsack approximation procedure that employs limited search among subsets of resources to reduce the expected cost even closer to the optimal value.

For a set of storage devices having different latencies, as an approximate strategy, all resources can be initially assigned to the slowest (that is, highest time delay) storage facility. Then, the resources are transferred, first to the fastest (that is, lowest time delay) storage facility until it is full, then to the storage facility with the next lowest time delay, and so on, employing the same basic strategies.

§ 4.2.4.4 Other Applications

Naturally, the download and distribution determination aspects of the present invention can be used together. For example, if a user having various storage facilities with various time delays wants to install software components, the download determination aspect of the present invention can be used to determine "what" software components to install and the distribution determination aspect of the present invention can be used to determine "where" (that is, on what storage facility) to install the various software components.

Downloading components by continuing to do ongoing probabilistic reasoning to update the expected value of the software components (or the expected cost of not having the components) as a function of richer notions of context, including inferences about a user's goals or intentions given a situation (See e.g., U.S. patent application Ser. No. 09/596,365, now issued as U.S. Pat. No: 7,249,159, entitled "Notification Platform Architecture," by Eric J. Horvitz, David O. Hovel, Carl M. Kadie, and Andrew W. Jacobs, filed on Jun. 17, 2000, and U.S. patent application Ser. No. 09/596,364, now issued as U.S. Pat. No: 6,601,012, entitled "Contextual Models and Methods for Inferring Attention and Location", by Eric J. Horvitz, David O. Hovel, Carl M. Kadie, Andrew W. Jacobs, Kenneth P. Hinckley and Timothy S. Paek, filed on Jun. 17, 2000. These applications are incorporated herein by reference.), may be advantageous.

§ 4.2.5 Fourth Exemplary Environment: Distributing Resources on a Network

Recall also that there are instances in which software components or resources, such as multimedia content for example, are loaded from a source server (e.g., an Internet server) to a more local intermediate storage facility(ies) (e.g., a regional proxy server, a resident server, a hard disk drive cache area, etc.). For example, recall that many software producers have been distributing software over the Internet, using the file transfer protocol (of "FTP") for example. Updates and patches to correct "bugs" in the software are also available over the Internet. Often, a download site, as a part of a software producer's home site, is provided at the software producer's Internet site server. In many instances, mirror sites, at various geographic locations, are used to provide the same download capability, but at a site "closer to" the end user or at a site having more excess capacity to serve download requests. As used in the previous sentence, the term "closer to" may relate to the request-to-receive time between the end user requesting and receiving a resource, the number of network node "hops" between a server and an end user, etc.

Recall also that Internet service providers may want to use local caching servers to (i) improve performance by using the cache as a dedicated local server, and (ii) reduce the amount of data movement in higher layers of the hierarchical network.

Below, an environment in which resources are intelligently distributed from a source (also referred to as a "resource origin server") to one or more intermediate storage facilities (also referred to as "intermediate resource servers") is described, with reference to FIG. 18, in § 4.2.5.1. Exemplary data structures for storing data used in this environment are described, with reference to FIGS. 8, 9, 10, and 16 in § 4.2.5.2 below. Finally, exemplary methods for performing the distribution decision function of the present invention in this environment is described, with reference to FIG. 19, in § 4.2.5.3 below.

§ 4.2.5.1 Environment

Figure 18:
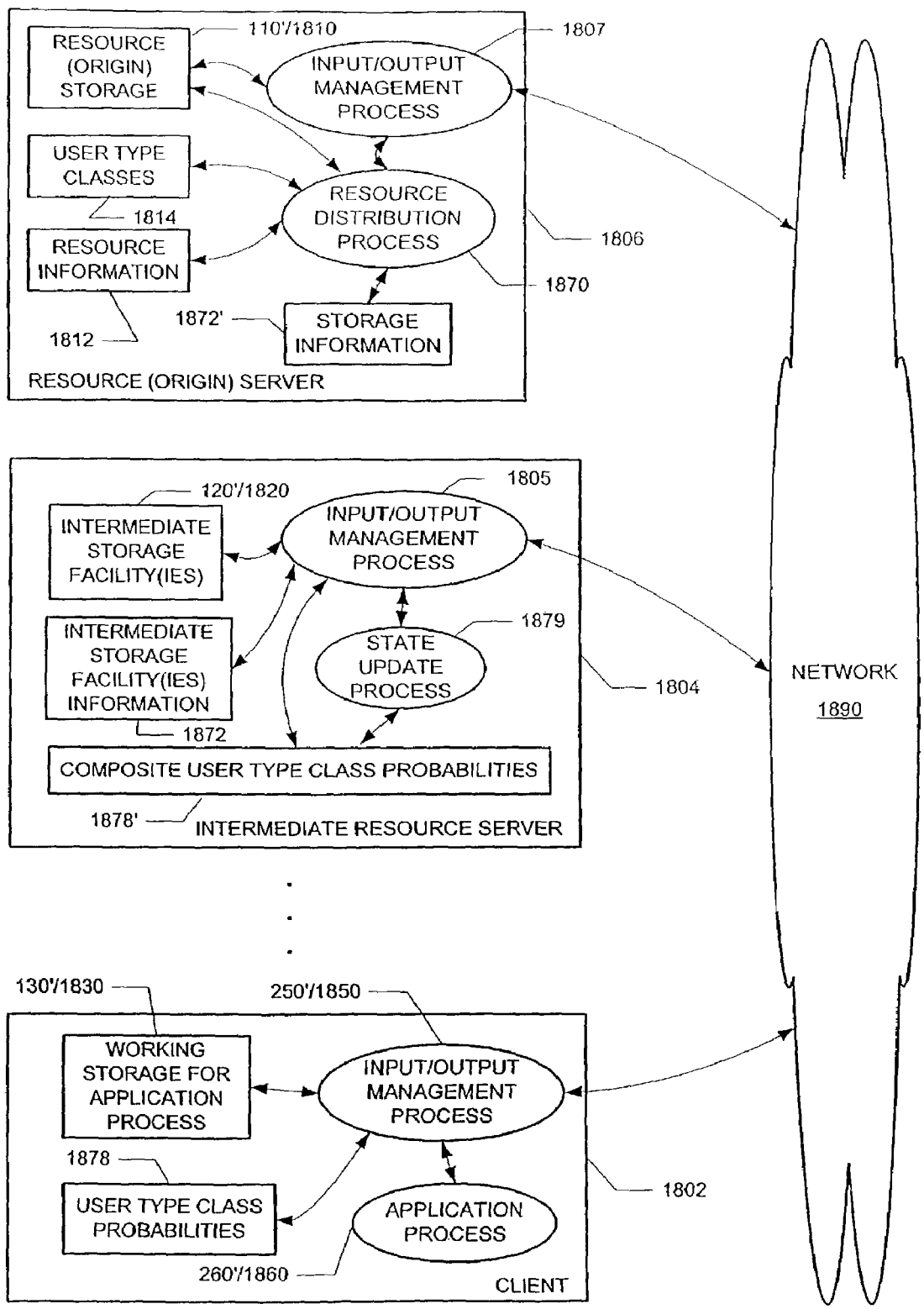
FIG. 18 is a high level block diagram which illustrates the operation of the present invention in a fourth exemplary environment.

FIG. 18 is a high level diagram of an environment 1800 in which an application process 260'/1860 of a client 1802 may want resources originating from a source 110'/1810 at a resource (origin) server 1806. If the resources requested by the application process 260'/1860 are not available in a working storage 130'/1830 at the client 1802, an input/output management process 250'/1850 looks for the needed resource on a network 1890, such as a LAN or a WAN for example. Copies of the resources may be stored at intermediate storage facilities 120'/1820 at intermediate resource servers 1804 which may be situated throughout the network 1890.

A resource distribution process 1870 may be used to determine how to optimally distribute resources, or copies of the resources, among the intermediate storage facilities 120'/1820 of the intermediate resource servers 1804.

The resource (origin) server 1806 may include a number of user type classes 1814. The client 1802 may store or compute probabilities that a user belongs to the various user type classes. The intermediate storage server 1804 may, using a state update processes 1879, periodically compute composite user type class probabilities 1878' based on the user type class probabilities from various clients 1802.

The resource (origin) server 1806 may also include resource information, such as average frequency of use by the various user type classes for example. In addition, the resource (origin) server 1806 may include information 1872' about its resource storage 110'/1810, such as composite or average (since there are a number of hosts 1802) request-to-receive time for example. Similarly, the intermediate storage server 1804 may include information 1872 about its storage facility(ies) 120'/1820, such as size or available capacity and composite or average (since there are a number of hosts 1802) request-to-receive time for example.

Thus, the resource distribution process 1870 may use information 1872' about the resource storage 110'/1810, resource information 1812, and information 1872 about intermediate storage facilities 120'/1820 and composite user type class probabilities 1878' to intelligently distribute resource among the intermediate storage device(s) 120'/1820 of one or more intermediate resource servers 1804. Having described the exemplary environment, data assessment and data structures are next described in § 4.2.5.2 below.

Å 4.2.5.2 Data Acquisition and Data Structures

Recall that the resource (origin) server 1806 may include a number of user class types 1814. As discussed above, the user class types may be assessed by an expert. Referring once again to FIG. 8, this information may be stored as a list 800 of user type classes 810.

Recall also that the client 1802 may store or compute probabilities that a user belongs to the various user type classes. As discussed above, this computation may be done by inferences from a Bayesian network which considers various types of evidence. Referring back to FIG. 9, this information may be stored as a list 900 of probabilities 910 that a user belongs to the various class types. Recall also that the intermediate storage server 1804 may, using a state update processes 1879, periodically compute composite user type class probabilities 1878' based on the user type class probabilities from various clients 1802. This composite may simply be an average of probabilities from a number of clients 1802. These composite probabilities may be stored in a list similar to that 900 of FIG. 9.

Recall also that the resource (origin) server 1806 may also include resource information, such as average frequency of use by the various user type classes for example. Again, this information may be forecast by an expert and periodically updated based on actual usage data. Referring to FIG. 10, this information may be stored as a table 1000 of records 1010. Each of the records 1010 may include a field 1012 for storing a resource identifier, a field 1014 for storing a size of the resource, and fields 1018 for storing frequencies of use of the resource by the various user type classes.

Further recall that the resource (origin) server 1806 may include information 1872' about its resource storage 110'/1810, such as composite or average (since there are a number of hosts 1802) request-to-receive time for example. This may be estimated by an expert and periodically updated. Note that this request-to-receive time may vary as a function of time, since client demand may peak and ebb at various times of the day, days of the week, etc. Similarly, recall that the intermediate storage server 1804 may include information 1872 about its storage facility(ies) 120'/1820, such as size or available capacity. The composite or average (since there are a number of hosts 1802) request-to-receive time may be determined as above. Here to, the request-to-receive time may be a function of time, since client demand may peak and ebb at various times. Note that the request-to-receive time may be updated after distribution or redistribution of resources. This request-to-receive time update is recommended since the more resources an intermediate resource server 1804 has, the more likely it will have increased demand. The size and request-to-receive time (including average or composite request-to-receive time) information may be stored in a table like that 1600 of FIG. 16.

More generally, a value density of storing a resource or component can be taken as the ratio of the expected change in value (or reduction in expected cost) of storing the component divided by the cost in terms of amount of memory required for storing the component. Thus, this value density may be expressed as:

$$\text{value density} = \frac{\text{expected value of storing resource}}{\text{cost of storing resource}} \quad (17)$$

The cost of storing the component may be simply the amount of memory required to store the component or a fee that might have to be paid to "rent" storage per time for the time the component is stored. The value of storing the component may be a perceived expected utility of storing the component under uncertainty, per request of the component, and a frequency of requests for the component. The frequency of requests of the component may be measured and/or predicted, and may be a function of classes of user types and number of users per class type, as well as probabilities derived from log files of information about components being accessed over time. Probabilities that each user belongs to a given class type may be determined in a manner similar to that described above. Thus, for example, a predicted frequency of use may be expressed as:

$$\text{frequency of requests for } resource_i = \quad (18)$$
$$\text{mean frequency of use of } resource_i \text{ by a user of class type } j \times$$
$$\sum_{\text{for all user class types } j} p(\text{class type } j) \times \text{number of users in } j$$

Context may be considered by conditioning the mean frequencies for the use of a resource (or component) by user classes, and the number of users in classes, on variables representing contextual information. For example, the release of some new content on the World Wide Web might attract more people from one group, and their access pattern may depend on the type of content released.

The perceived utility may be a function of the change in request-to-receive time, which in turn may be a function of a change in storage device read access speed, a change in network speed, a change in network latency, and a size of the resource (or component). The network speed may depend, in large part, on the lowest bandwidth link between the intermediate storage facility and the user. In many instances, the lowest bandwidth link is the link from the user. Thus, the network speed (and therefore, change in request-to-receive time, perceived utility, and value) may be a function of a user configuration, such as a dial up modem user, a cable modem user, a DSL user, an ISDN user, etc. Such users may be simply classified as "fast" users and "slow" users. Probabilities that a user is a fast user or a slow user may be measured or predicted. The network latency may be a function of a number of hops (e.g., routers) between the storage facility and the user, and a handshaking delay for communications set up and maintenance. It is important to note that the perceived utility is the utility of the distribution of the resource as perceived or valued by end users. Thus, certain differences in request-to-receive time delays may be so small as to be inconsequential, particularly if computers of the users have great tolerance for latencies with downloading, based on the task at hand, allowing more time to transmit the resource (or component).

Having described the fourth exemplary environment, as well as data which may be used by the resource distribution process 1870, an exemplary method for performing the resource distribution methods will now be described in § 4.2.5.3 below.

§ 4.2.5.3 Resource Distribution Method

Figure 19:
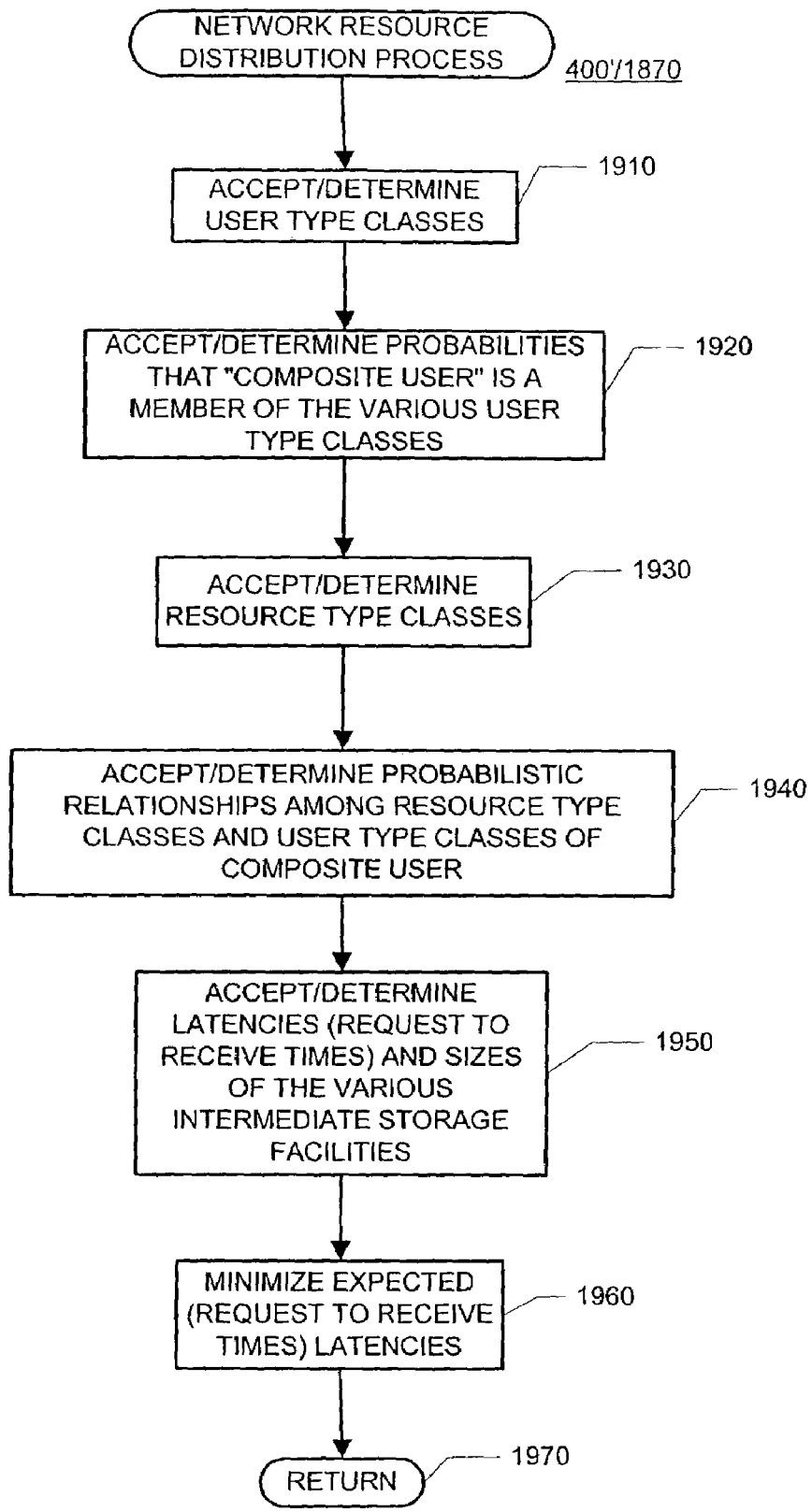
FIG. 19 is a high level flow diagram of an exemplary method for distributing resources among intermediate storage facilities in the fourth environment.

FIG. 19 is a high level flow diagram of an exemplary method 400'/1870' for performing a network resource distribution process 1870. First, as shown in act 1910, user type classes are accepted and/or determined. Once again, this information may be determined by an expert. Next, as shown in act 1920, the probabilities that a "composite user" belongs to various user type classes are accepted and/or determined. Recall that these probabilities may be averaged from probabilities determined from Bayesian networks at a number of the clients 1802. Then, as shown in act 1930, resource type classes are accepted or determined. The resource type classes will depend on the nature of the network. In the context of the Internet for example, the resource type classes may include "business", "science", "technology", "medical", "entertainment", "education", etc. for example. On the other hand, in the context of a company intranet, the resource type classes may include "finance", "legal", "research and development", "personnel", "marketing", etc. for example. Next, as shown in act 1940, probabilistic relationships between resource type classes and user type classes may be accessed and/or determined. Also, as shown in act 1950, request-to-receive times and sizes of various storage facilities in the network are accepted and/or determined. Finally, as shown in act 1960, the resources are distributed among the various storage facilities to minimize total expected request-to-receive times (until a next re-distribution for example). The method 400'/1870' is left via return node 1970.

Thus, the distribution analysis discussed above in § 4.2.4.3 is extended to consider resources shared by multiple users (or clients) so that such resources are intelligently distributed among multiple intermediate servers 1804 on a network 1890. In the generalized problem, the cost of spawning and storing new copies of a resource is compared with the cost of multiple users (or clients) requesting the same resource from a single server 1802. The multi-tiered knapsack technique discussed above may be used to minimize the expected cost.

As mentioned above, for real-time, dynamic redistribution of resources, it can be useful to consider the potential "burstiness", or peak and ebbs, in the requests for resources. One way to measure such time variation in demand is to forecast a single or changing mean frequency of the future resource requests within a specific time horizon, or as a function of time following the observed initial usage of a component after a period of disuse of that component. That is, the p(mean frequency of the requests for resource $r_i$=x|time t following observation of initial request following a period y of no requests) may be assessed. This probability may be considered when determining the expected cost. In such a case, the expected cost may be expressed as:

For any configuration of resources and their usage, the value of generating additional copies of the resources can be determined. Such a spawning of additional copies and storing them at a lower latency storage facility (such as more locally for example) is warranted when the decrease in the expected cost associated with the spawning and storing the new resource outweighs the cost of spawning and storing the new resource.

In view of the foregoing exemplary embodiment, beyond determining probabilities that a single user belongs to various user type classes, an amalgamation of users can be integrated to form a "user group" or a "composite user" and the distribution aspects of the present invention may be used to optimize value (such as minimizing expected costs for example) to the user groups by intelligently distributing and/or re-distributing resources.

Alternatively, a value density, such as that defined in expression (17) above, may be maximized. The resources are added to the intermediate storage facility (added to the knapsack), in the order of their value density, until the constraint of the intermediate storage facility is reached (until the knapsack is filled). That is, such that:

$$\Sigma s(r) \leq B \quad (1)$$

Where B is the size of available capacity of the intermediate storage facility(ies). Third, an alternative solution is defined as simply loading the most valuable resource to the intermediate storage facility(ies). Fourth, the overall value of the two solutions is compared and the solution with the maximum value is chosen.

Thus, in this example, the resources are ordered by their value density. These resource (or components ) are stored and their sizes $s(r_i)$ are summed until reaching the allocation limit.

This approximation algorithm may be enhanced by using a related knapsack approximation procedure that employs limited search among subsets of downloaded resources to reduce the expected cost even closer to the optimal value (See, e.g., the article: Sahni, S., "Approximate Algorithms for the 0/1 Knapsack Problem," *Assoc. Computing Machinery*, Vol. 22, pp. 115-124 (1975)). Specifically, the solution from this knapsack approximation procedure is within 1+1/k of the optimal value and is achieved by searching through all subsets of k or fewer items as the initial values of the greedy algorithm described above. Such subset searching can occur in given available time for additional optimization.

§4.2.6 Additional Features

§4.2.6.1 Updating Expert Assessments

Beyond relying on initial estimates, based on expert assessments, about usage patterns as a function of user type class, actual periodic usage (such as daily, weekly, etc.) may be monitored. Then, resources may be downloaded or periodically re-distributed, in accordance with the download or distribution decision function, respectively, of the present invention so that overall value is maximized or expected request-to-receive time costs are minimized based on the updated information. In the context of distribution, re-distribution can be applied to distributing files on a computer system in the general case of systems and application software components used in personal computing.

§ 4.2.6.2 Considering a Resource's Value

In each of the foregoing examples, the value was related to a probability that a user would use a resource at least once, or a frequency of use of a resource and a difference in request-to-receive times of various intermediate storage facilities.

Alternatively, or in addition, a relative value or importance of the functionalities provided by the resources may be considered. For example, suppose a businessman is downloading resources from a docking station to an un-tethered device. Although, a certain user type class may access stock prices more often than the telephone number of their stockbroker, having their stockbroker's telephone number may be more important to them, particularly if they can access stock prices through other means and may want to quickly execute a stock trade.

Thus, resource importance may be considered in determining a value goal. Similarly, the functionalities made available to users given capacity (such as available capacity of an intermediate storage facility) limitations may be considered. In this regard, the probability that a feature is used more than once may be expressed as:

$$p(\text{Feature used} >= 1) = \quad (22)$$
$$\sum_i p(\text{Feature used} >= 1 \mid \text{User Class}) \times p(\text{User class } i)$$

Further, for each feature, the conditional probability that optional resources (or components) associated with the feature would be used at least once should the application be used, p(Resource Used >=1| Feature used, User Type Class) for each user type class can also be determined. The probability that these software resources (or components) will be used at least once is simply the product of the probability that an application will be used and the conditional probability that an optional resource (or component) will be used, given that the application is used and the user class, and therefore may be expressed as:

$$p(\text{Resource Desired} >= 1) = \quad (23)$$
$$\sum_i p(\text{Resource Desired} >= 1 \mid \text{Feature used, User Class}) \times$$
$$p(\text{Feature used} >= 1 \mid \text{User Class}) \times p(\text{User class } i)$$

In some cases, to ease the task of assessment, it may be assumed that the probability that an optional resource (or component) is used given that an application is used is independent of the user type class. Given such an assumption, the probability that a resource (or component) will be used at least once may be expressed as:

$$p(\text{Resource Desired} >= 1) = \quad (24)$$
$$\sum_i p(\text{Resource Desired} >= 1 \mid \text{Feature used}) \times$$
$$p(\text{Feature used} >= 1 \mid \text{User Class}) \times p(\text{User class } i)$$

Maximizing the expected value of downloading resources (or components) given some specified amount of memory available within a quantity of memory specified by a distribution CD or by the available disk resources can be determined again by analyzing the marginal costs and benefits of downloading each of the software resources (or components). The value associated with each feature and sub-feature associated with software resources (or components) can therefore be considered. The values of functionalities may be assessed such that they represent the added value to the experience of the product in the overall life of the product. Alternatively, the value may be decomposed into a value associated with each usage. Each resource (or component) value may then be multiplied by the expected number of times that the feature will be used in the lifetime of the product.

Given a set of assigned values, the ratio of the incremental reduction of the expected incremental value gained with each resource (or component) is $\Delta V(r_i)$ and the change in storage requirement required for each component $\Delta M(r_i)$. Recall that a measure of the expected software storage value enhancement rate for each component $Rate(C_i)$ may be expressed as:

$$Rate(r_i)=\Delta V(r_i)/\Delta M(r_i) \qquad (6)$$

where $\Delta V(r_i)$ is just $p(r_i) \times$Value associated with use of the feature associated with the resource (or component).

As in the case for intelligently downloading resources by minimizing a cost, a greedy algorithm can be used to maximize the expected value of an information store. For example, resources (or components) for downloading may be ordered by $Rate(r_i)$ and added to the intermediate storage facilities until the sum of the sizes of the resources (or components) reaches the allocation limit. The overall value of this solution is then compared with the value obtained when only the software resource (or component) with the highest marginal value $R(r_i)$ is stored.

§ 4.2.6.3 Changing a Constraint of the Intermediate Storage Facility

Figure 24:
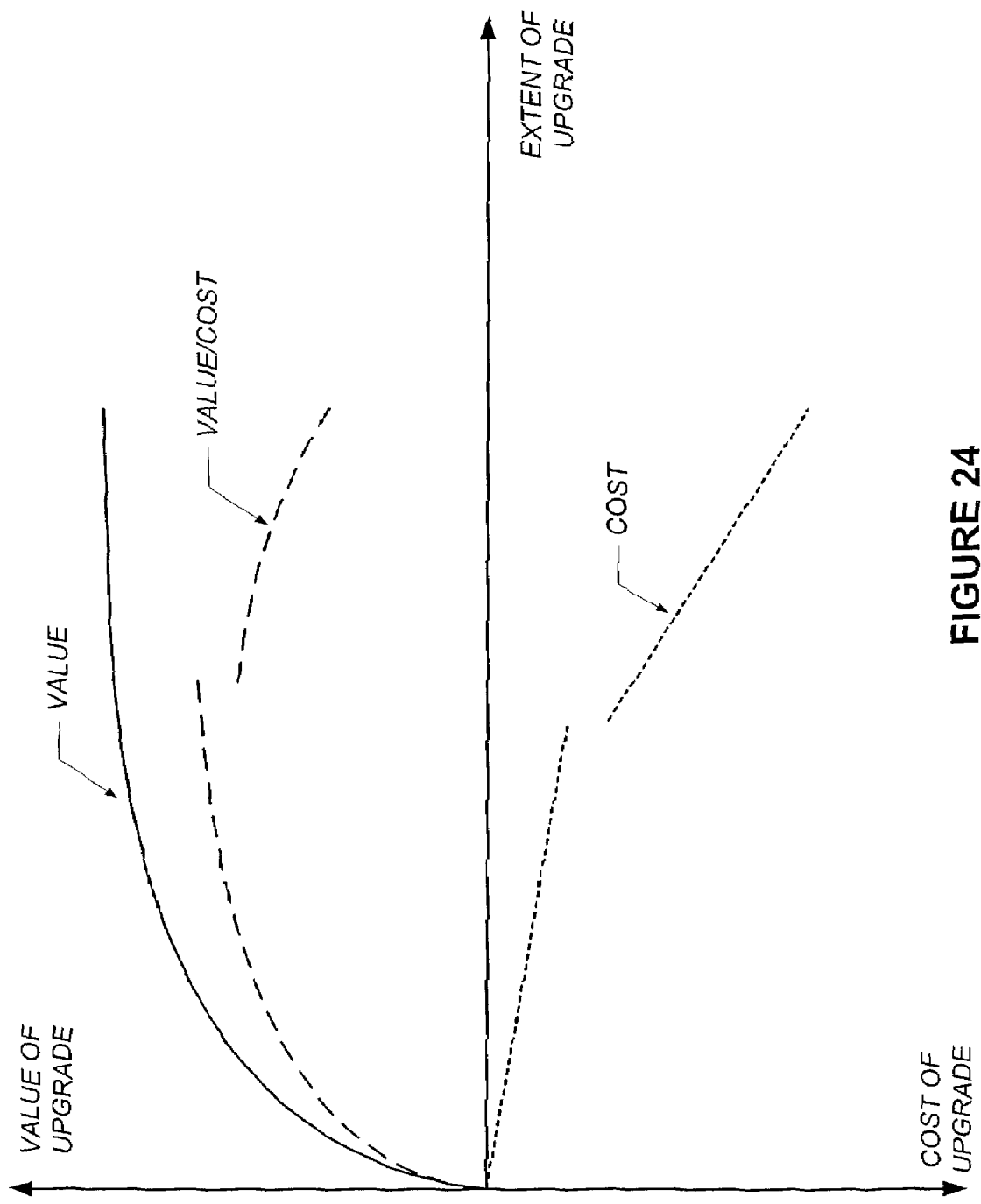
FIG. 24 illustrates a value/cost curve.

In each of the foregoing examples, a value was maximized (and/or a cost was minimized) given a constraint, such as a constraint on available storage capacity. However, in many instances, it would be extremely useful to determine whether or not to change (e.g., increase or decrease) this constraint. For example, in the context of replicating content on one or more intermediate storage facilities, it would be extremely useful to determine whether or not to increase (or decrease) the storage capacity of one or more of the intermediate storage facilities. In this case, an increase (or decrease) in value associated with the upgrade (or downgrade) is compared with an increase (or savings) in cost associated with the upgrade (or downgrade). Thus, for example, if extra storage capacity where added to an intermediate storage facility, an increase in value could be compared with a cost associated with the storage capacity upgrade. If the units of value and cost are the same (e.g., dollars), then the difference between value and cost is to be maximized. Indeed, any positive difference would indicate that a change is better than maintaining the status quo. If the units of value and cost are not the same, then the ratio of value to cost is to be maximized. Indeed, any ratio over one would indicate that a change is better than maintaining the status quo. FIG. 24 illustrates an exemplary value/cost curve based on the extent of an upgrade. A value versus upgrade extent curve is depicted with a solid line. A cost versus upgrade extent curve is depicted with a short-dashed line. Notice that there may be discontinuities. A value-cost curve is depicted with a long-dashed line.

§ 4.3 EXAMPLES OF OPERATION

In the following, examples of possible operations, including data flow, in each of the foregoing exemplary environments are described.

§ 4.3.1 Example of Operation of First Exemplary Embodiment

Figure 20:
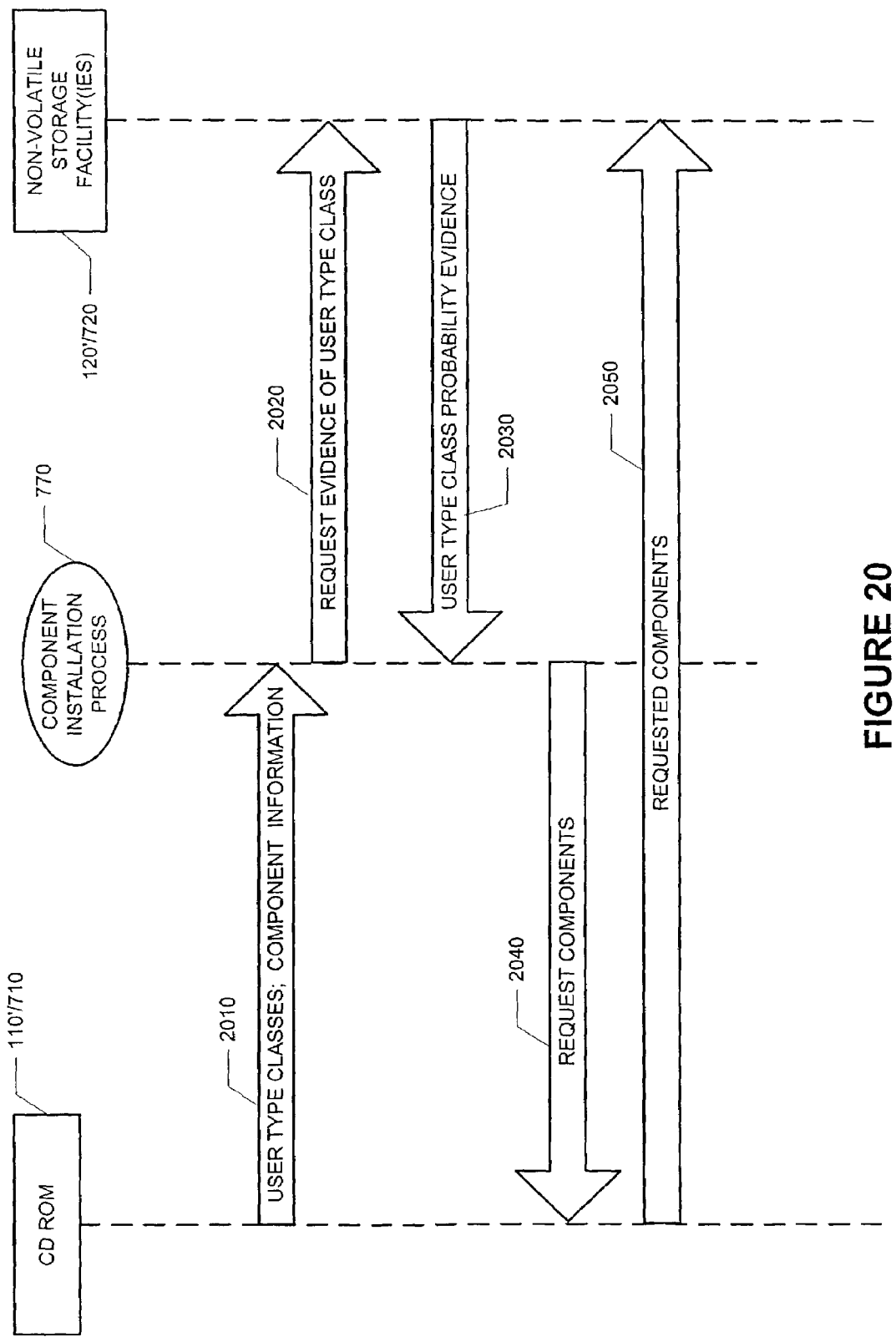
FIG. 20 is a data messaging diagram of an exemplary operation of the present invention in the first exemplary environment.

FIG. 20 illustrates the flow of data in an exemplary operation of the first exemplary embodiment. As shown in flow 2010, user type classes and resource (or component) information may be provided from the CD ROM 110'/710 to the component installation process 770. Based on the user type classes, as shown in flow 2020, the resource (or component) installation process may request evidence of user type class. Such evidence may be found on the non-volatile storage facility(ies) 120/720 and/or may be provided via user responses to queries generated by the resource (or component) installation process 770. As shown in flow 2030, this user type class probability evidence may be provided to the resource (or component) installation process 770. Using the user type class probability evidence and the resource (or component) information, the resource (or component) installation process 770 may determine which resources (or components) to install, as described in § 4.2.2 above. As shown in flow 2040, the resource (or component) installation process 770 requests certain resources (or components) from the CD ROM 110'/710. Finally, as shown in flow 2050, the requested resources (or components) are provided from the CD ROM 110'/710 to the non-volatile storage facility(ies) 120'/720.

§ 4.3.2 Example of Operation of Second Exemplary Embodiment

Figure 21:
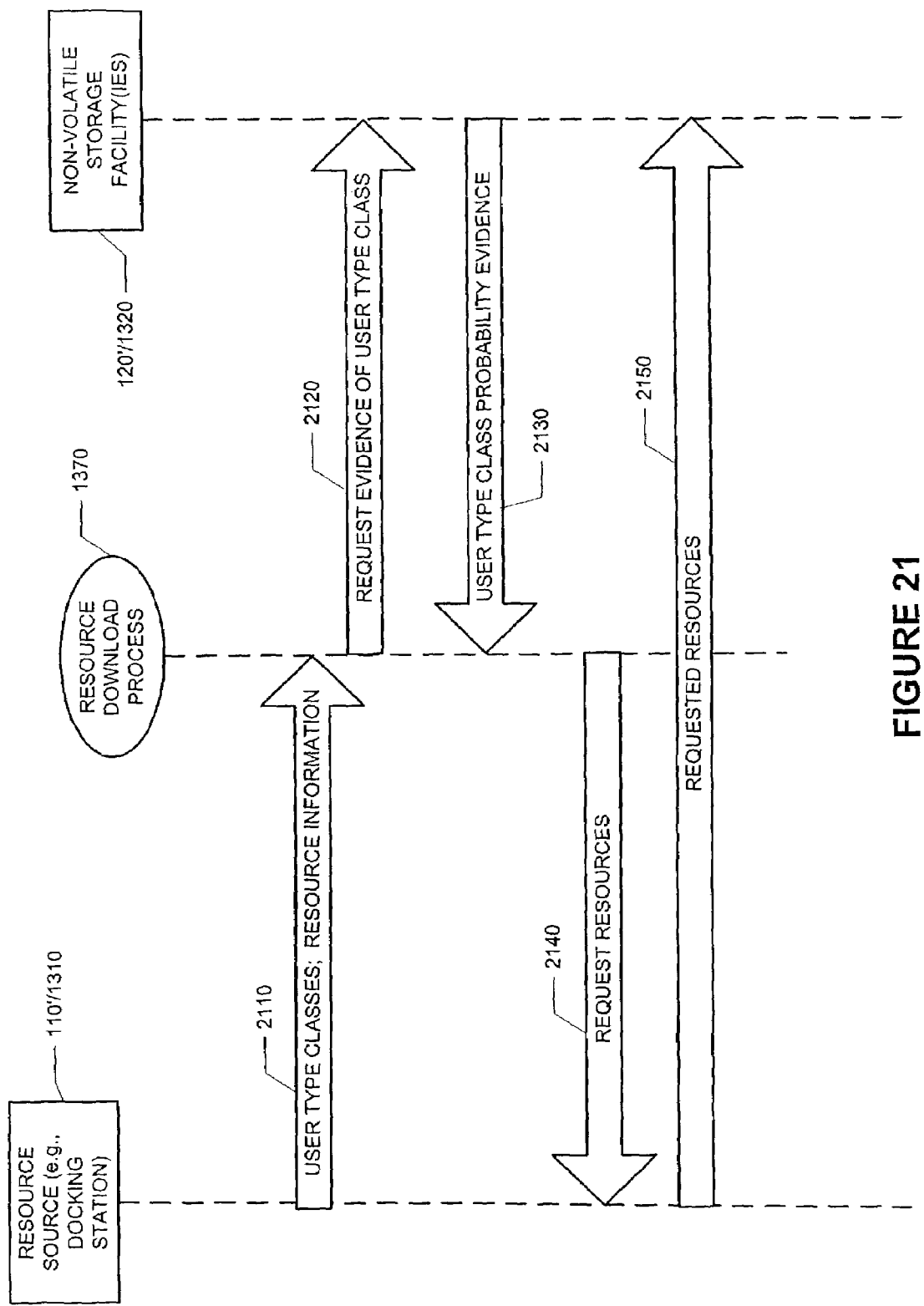
FIG. 21 is a data messaging diagram of an exemplary operation of the present invention in the second exemplary environment.

FIG. 21 illustrates the flow of data in an exemplary operation of the second exemplary embodiment. As shown in flow 2110, user type classes and resource information may be provided from the resource source (such as a docking station for example) 110'/1310 to the resource download process 1370. Based on the user type classes, as shown in flow 2120, the resource download process 1370 may request evidence of user type class. Such evidence may be found on the non-volatile storage facility(ies) 120/1320 and/or may be provided via user responses to queries generated by the resource download process 1370. As shown in flow 2130, this user type class probability evidence may be provided to the resource download process 1370. Using the user type class probability evidence and the resource information, the resource download process 1370 may determine which resources to download, as described in § 4.2.3 above. As shown in flow 2140, the resource download process 1370 may request certain resources from the resource source 110'/1310. Finally, as shown in flow 2150, the requested resources are provided form the resource source 110'/1310 to the non-volatile storage facility(ies) 120'/1320.

§ 4.3.3 Example of Operation of Third Exemplary Embodiment

Figure 22:
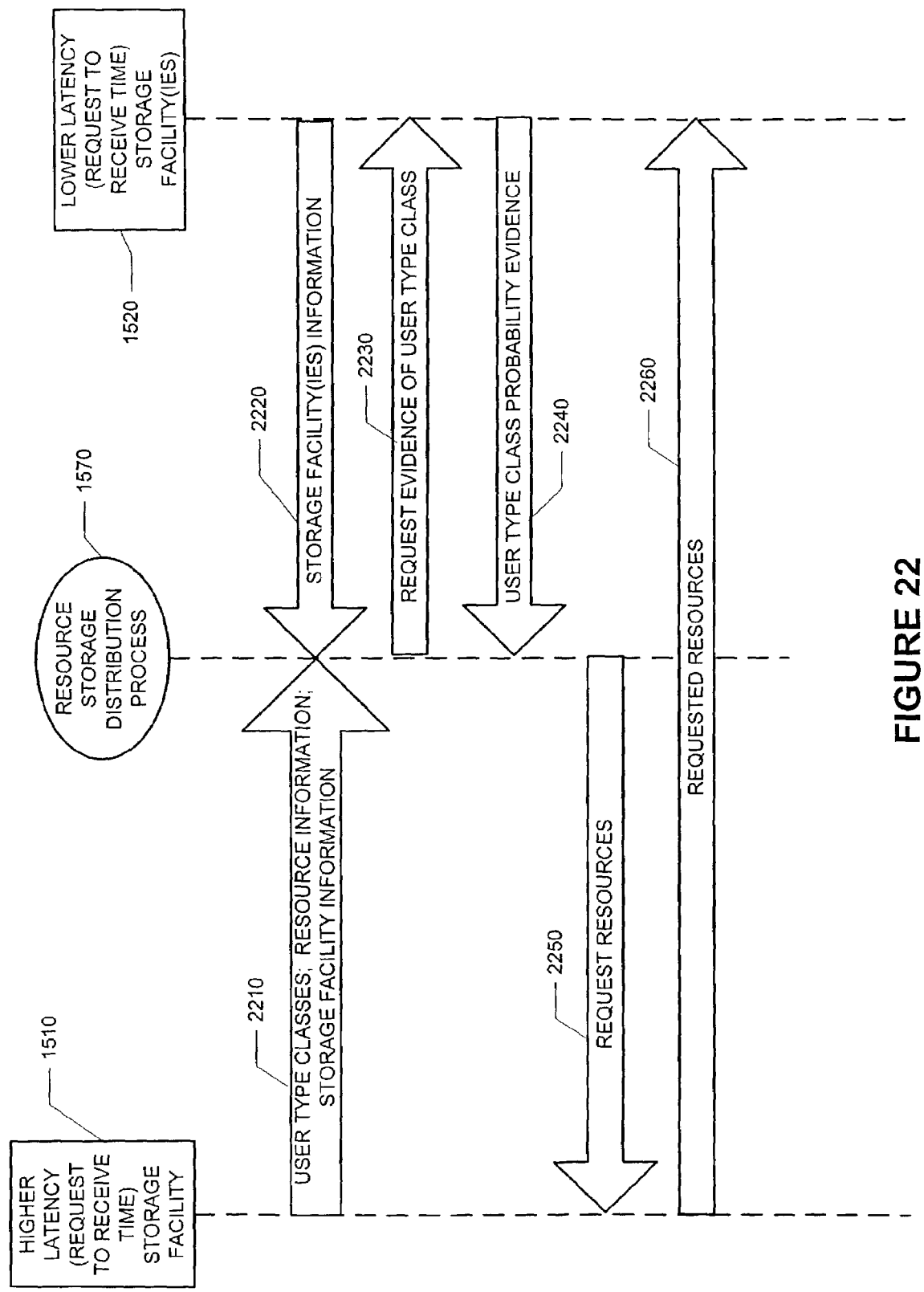
FIG. 22 is a data messaging diagram of an exemplary operation of the present invention in the third exemplary environment.

FIG. 22 illustrates the flow of data in an exemplary operation of the third exemplary embodiment. As shown in flow 2210, user type classes, resource information, and storage facility information may be provided from a higher request-to-receive time (also referred to as "latency") storage facility 1510 to the resource storage distribution process 1570. As shown in flow 2220, storage facility(ies) information may also be provided from a lower latency storage facility 1520 to the resource storage distribution process 1570. Based on the user type classes, as shown in flow 2230, the resource storage distribution process 1570 may request evidence of user type class. Such evidence may be found on one of the storage facilities 1510 or 1520 and/or may be provided via user responses to queries generated by the resource storage distribution process 1570. As shown in flow 2240, this user type class probability evidence may be provided to the resource storage distribution process 1570. Using the user type class probability evidence, the resource information, and the storage facilities information, the resource storage distribution process 1570 may determine how (that is, on which storage facilities) to distribute the resources, as described in § 4.2.4 above. As shown in flow 2250, the resource storage distribution process 1870 may request certain resources from the higher latency storage facility 1510 so that they may be stored on the lower latency storage facility 1520. Finally, as shown in flow 2260, the requested resources may be provided from the higher latency storage facility 1510 to the lower latency storage facility 1520.

§ 4.3.4 Example of Operation of Fourth Exemplary Embodiment

Figure 23:
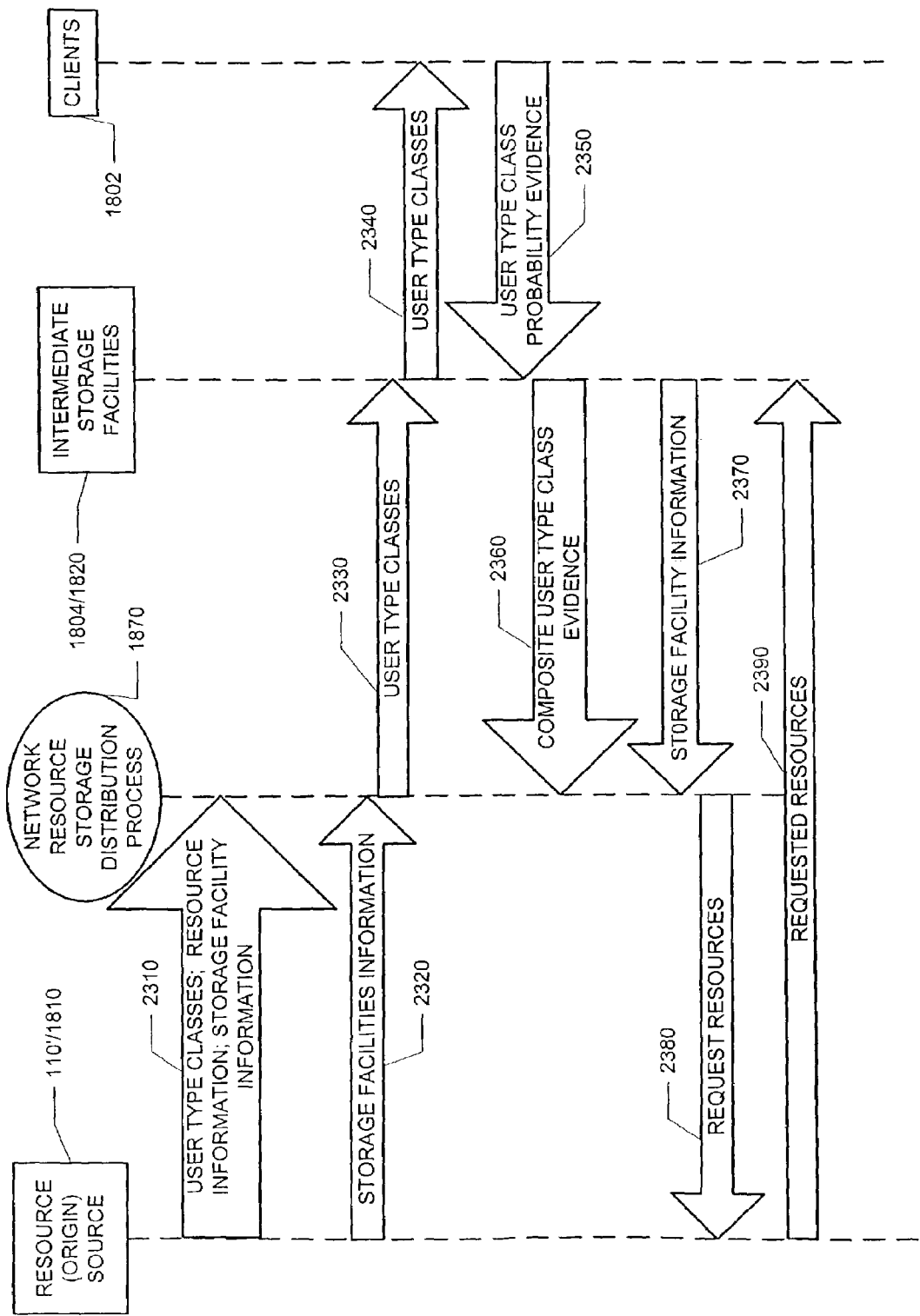
FIG. 23 is a data messaging diagram of an exemplary operation of the present invention in the fourth exemplary environment.

FIG. 23 illustrates the flow of data in an exemplary operation of the fourth exemplary embodiment. As shown in flow 2310, user type classes (or, alternatively, just frequency of use by all users), resource information, and storage facility information may be provided from a resource (origin) source 110'/1810 to the network resource storage distribution process 1870. As shown in flow 2320, storage facility(ies) information may also be provided from the resource (origin) source 110'/1810 to the network resource storage distribution process 1870. Based on the user type classes, as shown in flow 2230, the network resource storage distribution process 1870 may request evidence of user type class. Such requests may be passed to end clients as shown in flow 2340. Such evidence may be found on one of the storage facilities of the clients. As shown in flow 2350, this user type class probability evidence may be provided to the intermediate storage facilities which aggregate this information to generate composite user type class evidence which is forwarded to the network distribution process 1870 as shown in flow 2360. Further, storage facility information may be provided from the intermediate storage facilities as shown in flow 2370. Using the composite user type class probability evidence, the resource information, and the storage facilities information, the network resource storage distribution process 1870 may determine how (that is, on which storage facilities) to distribute the resources, as described in § 4.2.5 above. As shown in flow 2380, the network resource storage distribution process 1870 may request certain resources from the resource (origin) source 110'/1810 so that they may be stored on an appropriate one of the intermediate storage facilities 1804/1820. Finally, as shown in flow 2390, the requested resources may be provided from the resource (origin) source 110'/1810 to the appropriate ones of the storage facilities 1804/1820.

§ 4.4. Conclusions

In view of the foregoing, the present invention provides methods and apparatus for intelligently installing software resources (or components). The present invention also provides methods and apparatus for intelligently downloading software resources (or components) and data to un-tethered computing devices. The methods and apparatus are relatively automated, thereby relieving users of often uninformed, difficult, or confusing decisions. These methods and apparatus minimize the risk, while conserving storage resources, that a user will need a software resource (or component) or data that was not downloaded.

The present invention also provides methods and apparatus for intelligently distributing resources among storage facilities having various latencies. These methods and apparatus minimize expected costs based on relative latency differences between storage facilities and frequency of use of resources. Alternatively, these methods and apparatus maximize the overall expected utility based on considering the value of storing the resource (or component) versus the cost of storing the resource (or component).

Finally, the present invention provides methods and apparatus for determining whether or not to change (e.g., increase or decrease) a capacity (or some other characteristic, such as read access time) of an intermediate storage facility.

What is claimed is:

1. A computer implemented method for downloading resources, from a source to one or more intermediate storage facility(ies) having a finite storage capacity, the computer implemented method comprising the following computer executable acts:
   - determining a probability of using a resource, the probability in part determined by:
     - maximizing an expected value of downloaded resources via a computation that takes input parameters, wherein the input parameters include at least one user-based factor and at least one resource-based factor;
     - evaluating a cost of accessing resources in a source in a non-downloaded condition; and comparing said cost with a cost of accessing resources for the at least one of the intermediate storage facilities in an downloaded condition; and
   - distributing resources downloaded from the source based on the determining step among a plurality of storage media associated with the intermediate storage facilities to minimize total request-to-receive time.

2. The computer implemented method of claim 1 further comprising determining probabilities that a user belongs to various user type classes.

3. The computer implemented method of claim 2 wherein the probabilities that a user belongs to various user type classes are determined based on evidence using a Bayesian network.

4. The computer implemented method of claim 2 wherein the at least one resource-based factor includes probabilities that users of the various user type classes will use the resource at least once.

5. The computer implemented method of claim 2, wherein the at least one resource-based factor is a probability that the resource will be used at least once and is based on a sum, over all user type classes, of a product of:
   - a probability that the resource is used at least once, given that an application to which the resource belongs is used at least once, by a user of the user type class;
   - a probability that the application to which the resource belongs is used at least once by a user of the user type class; and
   - a probability that the user belongs to the user type class.

6. The computer implemented method of claim 1 wherein the at least one resource-based factor includes probabilities that users of various user type classes will use the resource at least once.

7. The computer implemented method of claim 1 wherein the at least one resource-based factor includes an association of each of the resources to at least one application class.

8. The computer implemented method of claim 7 wherein the at least one resource-based factor includes an indication, for each of the resources, of whether the resource is a core component or an optional component of the application class with which it is associated.

9. The computer implemented method of claim 1 wherein the act of maximizing an expected value of downloaded resources includes maximizing an expected value density of downloaded resources.

10. The computer implemented method of claim 1 wherein the act of maximizing an expected value of downloaded resources includes minimizing an expected cost of not having a needed resource.

11. The computer implemented method of claim 10 wherein the expected cost of not having a needed resource is based on one of enhancement rates of the resources and value densities of the resources.

12. The computer implemented method of claim 11 wherein the enhancement rate of a resource is based on the size of the resource, a probability of that resource being used at least once, and a cost of later downloading the resource.

13. The computer implemented method of claim 11 wherein the value density of a resource is based on the size of the resource and the probability that the resource will be used at least once.

14. A computer implemented system for downloading resources from a source to a plurality of storage facilities, comprising a computer for executing the following computer executable components:
   means for intelligently downloading a resource to at least one of the plurality of storage facilities based on a probability of use of resources,
   means for determining the probability of use of resources by maximizing an expected value of downloaded resources to at least one of the plurality of storage facilities via a computation that takes input parameters, wherein the input parameters include at least one user-based factor and at least one resource-based factor,
   means for evaluating a cost to retrieve resources in the source in a non-downloaded condition, and for evaluating a cost to retrieve resources from the source to at least one of the storage facilities in a downloaded condition based on the probability of use;
   means for comparing the cost to retrieve resources in the non-downloaded condition with cost to retrieve resources in the downloaded condition; and
   means for optimizing distribution among the plurality of storage facilities to minimize total request-to-receive times based on the comparing act.

15. A computer implemented method of downloading a resource from a source to a plurality of storage facilities comprising the following computer executable acts:
   determining a probability of use for a resource by a user in a user type class; wherein the determining includes:
   maximizing an expected value of downloaded resources to at least one of the plurality of storage facilities via a computation that takes input parameters, wherein the input parameters include at least one user-based factor and at least one resource-based factor,
   comparing a cost to retrieve resources in the source in a non-downloaded condition with a cost to retrieve resources from the source to at least one of the plurality of storage facilities in a downloaded condition;
   changing a storage capacity of at least one of the plurality of storage facilities based on a change of the expected value and the comparing act.

16. A computer implemented method for installing software components, each having a size, from a source to a plurality of storage facilities, the method comprising, the following computer executable acts:
   predicting an expected frequency of use for a software component, in part via:
   maximizing an expected value of downloaded resources to at least one of the plurality of storage facilities via a computation that takes input parameters, wherein the input parameters include at least one user-based factor and at least one resource-based factor,
   comparing a cost to retrieve resources in the source in a non-downloaded condition with a cost to retrieve resources from the source to at least one of the plurality of storage facilities in a downloaded condition; and
   changing a storage capacity of at least one of the plurality of storage facilities and downloading resources among the plurality of storage facilities based on the predicting act.

17. The computer implemented method of claim 16 wherein the at least one user-based factor includes probabilities that a user is member of various user type classes.

18. The computer implemented method of claim 16 wherein the at least one component-based factor includes an association of each of the software components to one of a plurality of application classes.

19. The computer implemented method of claim 18 wherein the at least one component-based factor further includes an indication, for each of the software components, of whether the software component is a core component or an optional component of the application class with which it is associated.

20. The computer implemented method of claim 19 wherein the at least one component-based factor further includes probabilities that each of the software components will be used at least once by users of various user type classes.

21. A computer implemented method for distributing resources, each having a size, among at least two storage facilities, the method comprising the following computer executable acts:
   determining a probability of using resources by maximizing an expected value of downloaded resources from a source to the at least two storage facilities via a computation that takes input parameters, wherein the input parameters include at least one user-based factor, at least one resource-based factor, and at least one storage facility-based factor;
   comparing a cost to retrieve resources in the source in a non-downloaded condition with a cost to retrieve resources from the source to the at least two storage facilities in a downloaded condition;
   minimizing total expected request-to-receive time based on the determining act and comparing act;
   changing a storage space associated with the at least two storage facilities, based on the minimizing act,
   and distributing the resources among the at least two storage facilities.

22. The computer implemented method of claim 21 wherein the at least one user-based factor includes probabilities that a user belongs to various user type classes.

23. The computer implemented method of claim 22 further comprising determining the probabilities that a user belongs to various user type classes.

24. The computer implemented method of claim 23 wherein the probabilities that a user belongs to various user type classes are determined based on evidence using a Bayesian network.

25. The computer implemented method of claim 22 wherein the at least one resource-based factor includes frequencies at which users of the various user type classes will use each of the resources.

26. The computer implemented method of claim 25 wherein the at least one storage facility-based factor includes an available capacity of each of the at least two storage facilities and a relative request-to-receive latency of each of the at least two storage facilities.

27. The computer implemented method of claim 26 wherein the total expected latencies is a function of the frequencies at which users of the various user type classes will use each of the resources, and a difference between the relative request-to-receive latencies of the at least two storage facilities.

28. The computer implemented method of claim 21 wherein the at least one storage facility-based factor includes an available capacity of each of the at least two storage facilities and a relative request-to-receive latency of each of the at least two storage facilities.

29. The computer implemented method of claim 21 wherein the total expected latencies to request and receive resources is minimized based on value densities of the resources.

30. The computer implemented method of claim 29 wherein the value densities of the resources are based on the frequency of use of the resources and a difference in request to receive latencies between the at least two storage facilities.

31. A computer implemented method of distributing resources, each having a size, among at least two storage facilities, each of the storage facilities having a finite available capacity, the computer implemented method comprising the following computer executable acts:
- a first determining a probability of using a resource distributed among the at least two storage facilities by a composite user; wherein the first determining includes:
- a second determining, for each resource, a change in value of storing the resource on a first storage facility versus storing the resource on a second storage facility and
- a third determining, for each resource, a change in cost of storing the resource on the first storage facility versus storing the resource on the second storage facility;
- a fourth determining, for each resource, a value density in a knapsack approximation procedure based on the change in value and cost as a result of the first determining act;
- wherein the fourth determining includes maximizing an expected value of downloaded resources to the at least two plurality of storage facilities via a computation that takes input parameters, wherein the input parameters include at least one user-based factor and at least one resource-based factor,
- distributing the resources among the at least two storage facilities based on the fourth determining act.

32. The computer implemented method of claim 31 wherein the value of storing a resource on the first storage facility is a function of a perceived utility of such storage, per request for the resource, and a frequency of requests for the resource.

33. The computer implemented method of claim 32 wherein the perceived utility of such storage, per request for the resource, is a function of a request-to-receive time delay.

34. The computer implemented method of claim 33 wherein the request-to-receive time delay is a function of at least one of: a storage device read access time, a network speed, a network latency, and the size of the resource.

35. The computer implemented method of claim 34 wherein the network speed is a function of a user configuration.

36. The computer implemented method of claim 32 wherein the frequency of requests for the resource is a function of a user type class and a number of users belonging to the user type class.

37. The computer implemented method of claim 31 wherein the cost of storing a resource on the first storage facility is a function of the resource size.

38. A computer implemented method of downloading a resource(s) from a source to a plurality of storage facilities comprising the following computer executable acts:
- minimizing total expected latencies to request and receive resources, by:
- determining a probability of using resources by maximizing an expected value of downloaded resources from the source to at least one of the storage facilities via a computation that takes input parameters, wherein the input parameters include at least one user-based factor, at least one resource-based factor, and at least one storage facility-based factor;
- determining a cost of returning resources to the source in a non-downloaded condition, and comparing said cost with cost of accessing resources from the source to at least one of the storage facilities in an downloaded condition; and
- distributing resources among the plurality of storage facilities based on the probability of use and the comparing act.

39. The computer implemented method of claim 38 further comprising changing a storage capacity associated with the plurality of storage facilities based on at least one of a change in value and cost.

40. The computer implemented method of claim 39 farther comprising changing the storage capacity when a ratio of value to cost is greater than one.

41. The computer implemented method of claim 40 wherein the at least one user-based factor is a function of a time offline until the one of the plurality of storage facilities is reconnected with a source.

42. The computer implemented method of claim 41 wherein the time offline is a probability distribution considering at least one of: a resource context, a user type class, and a recent usage pattern.

* * * * *